(12) United States Patent
Tomita et al.

(10) Patent No.: US 10,429,786 B2
(45) Date of Patent: Oct. 1, 2019

(54) DRIVE TRANSMISSION DEVICE AND IMAGE FORMING APPARATUS INCORPORATING THE DRIVE TRANSMISSION DEVICE

(71) Applicants: Kenji Tomita, Tokyo (JP); Junpei Kamichi, Tokyo (JP); Hiroaki Nieda, Kanagawa (JP); Kimihiro Tanaka, Kanagawa (JP); Hideto Higaki, Kanagawa (JP); Yuuki Shiga, Kanagawa (JP); Jumpei Aoyama, Kanagawa (JP); Hirofumi Horita, Kanagawa (JP)

(72) Inventors: Kenji Tomita, Tokyo (JP); Junpei Kamichi, Tokyo (JP); Hiroaki Nieda, Kanagawa (JP); Kimihiro Tanaka, Kanagawa (JP); Hideto Higaki, Kanagawa (JP); Yuuki Shiga, Kanagawa (JP); Jumpei Aoyama, Kanagawa (JP); Hirofumi Horita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/033,429

(22) Filed: Jul. 12, 2018

(65) Prior Publication Data
US 2019/0018353 A1    Jan. 17, 2019

(30) Foreign Application Priority Data

Jul. 14, 2017 (JP) .................................. 2017-138519
Nov. 17, 2017 (JP) .................................. 2017-221883

(51) Int. Cl.
G03G 15/00  (2006.01)
G03G 15/20  (2006.01)
(Continued)

(52) U.S. Cl.
CPC ....... *G03G 15/2064* (2013.01); *F16H 53/025* (2013.01); *G03G 15/1615* (2013.01);
(Continued)

(58) Field of Classification Search
USPC ......... 399/107, 110, 111, 116, 117, 122, 167
See application file for complete search history.

(56) References Cited

U.S. PATENT DOCUMENTS 9,268,247 B2 *  2/2016  Yamazaki ............... F16D 11/00
9,880,508 B2 *  1/2018  Tomita .................. G03G 15/757
(Continued)

FOREIGN PATENT DOCUMENTS

JP       10-089444      4/1998
JP       2010-128132    6/2010
(Continued)

*Primary Examiner* — Hoan H Tran
(74) *Attorney, Agent, or Firm* — Harness, Dickey & Pierce, P.L.C.

(57) ABSTRACT

A drive transmission device, which is included in an image forming apparatus, includes a drive transmission body to which a drive force is applied from a driving source, and a rotary shaft having a press-in portion mounted on one end thereof in the axial direction. The press-in portion has multiple planes disposed parallel to an axial direction and configured to receive the drive transmission body. The multiple planes include upstream and downstream side planes disposed downstream from the upstream side plane in a press-in direction of the drive transmission body. The upstream and downstream side planes are aligned along the press-in direction of the drive transmission body and have respective distances different from each other from an axial center of the rotary shaft. A distance from the downstream side plane to the axial center is greater than a distance from the upstream side plane to the axial center.

12 Claims, 27 Drawing Sheets

(51) Int. Cl.
*F16H 53/02* (2006.01)
*G03G 21/16* (2006.01)
*G03G 15/16* (2006.01)

(52) U.S. Cl.
CPC ..... *G03G 15/2032* (2013.01); *G03G 15/2053* (2013.01); *G03G 21/1685* (2013.01)

(56) References Cited

U.S. PATENT DOCUMENTS

2017/0343937 A1   11/2017   Tomita et al.
2018/0112762 A1   4/2018    Nieda

FOREIGN PATENT DOCUMENTS

JP   2012-229723   11/2012
JP   2017-215388   12/2017

\* cited by examiner

FIG. 19A1
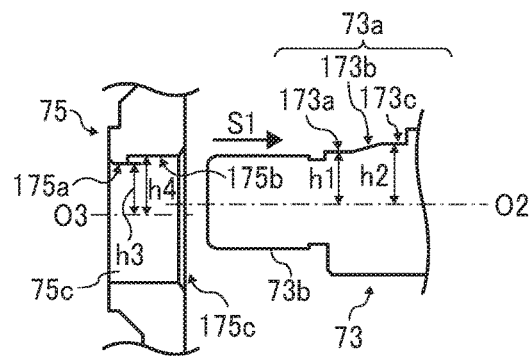
FIG. 19B1
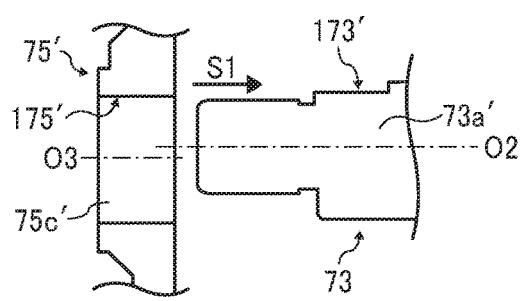
FIG. 19A2
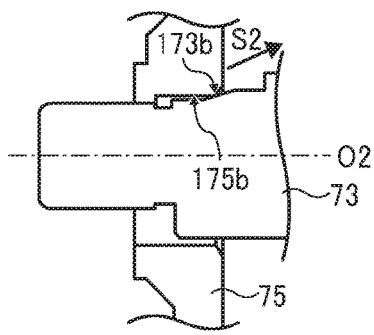
FIG. 19B2
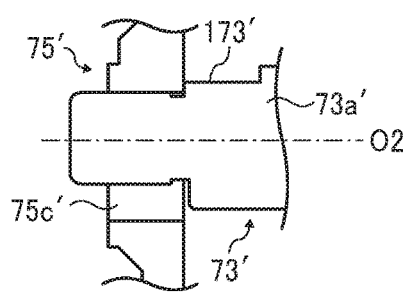
FIG. 19A3
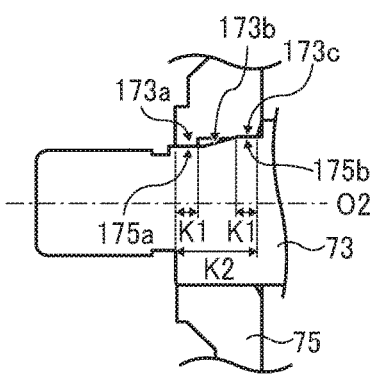
FIG. 19B3
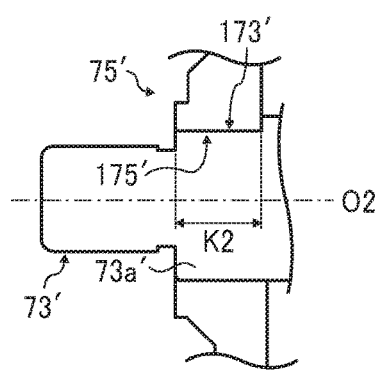

ROTATED BY ANGLE OF 180 DEGREES

T>R

ROTATED BY ANGLE OF 180 DEGREES

T>R

DRIVE TRANSMISSION DEVICE AND IMAGE FORMING APPARATUS INCORPORATING THE DRIVE TRANSMISSION DEVICE

CROSS-REFERENCE TO RELATED APPLICATIONS

This patent application is based on and claims priority pursuant to 35 U.S.C. § 119(a) to Japanese Patent Application Nos. 2017-138519, filed on Jul. 14, 2017, and 2017-221883, filed on Nov. 17, 2017, in the Japan Patent Office, the entire disclosure of each of which is hereby incorporated by reference herein.

BACKGROUND

Technical Field

This disclosure relates to a drive transmission device and an image forming apparatus incorporating the drive transmission device.

Related Art

Various drive transmission devices are known to include a drive transmission member to transmit a driving force from a drive source, a plane that expands parallel to an axial direction, and a rotary shaft having one end in the axial direction on which a press-in portion is mounted. The drive transmission member is pressed into the press-in portion.

A known drive transmission device includes a press-in portion having a polygonal cross sectional shape, mounted on one end of the rotary shaft. A gear (or gears) that functions as a drive transmission member is pressed into the press-in portion.

SUMMARY

At least one aspect of this disclosure provides a drive transmission device including a drive transmission body and a rotary shaft. A drive force is applied form a drive source to the drive transmission body. The rotary body has a press-in portion mounted on one end thereof in an axial direction. The press-in portion has multiple planes disposed parallel to the axial direction and is configured to receive the drive transmission body. The multiple planes include an upstream side plane and a downstream side plane disposed downstream from the upstream side plane in a press-in direction of the drive transmission body. The upstream side plane and the downstream side plane are aligned along the press-in direction of the drive transmission body and having respective distances different from each other from an axial center of the rotary shaft. A distance from the downstream side plane to the axial center is greater than a distance from the upstream side plane to the axial center.

Further, at least one aspect of this disclosure provides an image forming apparatus including an image forming device configured to form an image on a recording medium, and the above-described drive transmission device that is configured to transmit the driving force applied by the drive source to the drive target body.

BRIEF DESCRIPTION OF THE SEVERAL VIEWS OF THE DRAWINGS

An exemplary embodiment of this disclosure will be described in detail based on the following figured, wherein:

FIGS. 19A1, 19A2, 19A3, 19B1, 19B2 and 19B3 are diagrams illustrating respective steps when the worm wheel is pressed into the drive shaft;

DETAILED DESCRIPTION

Figure 1:
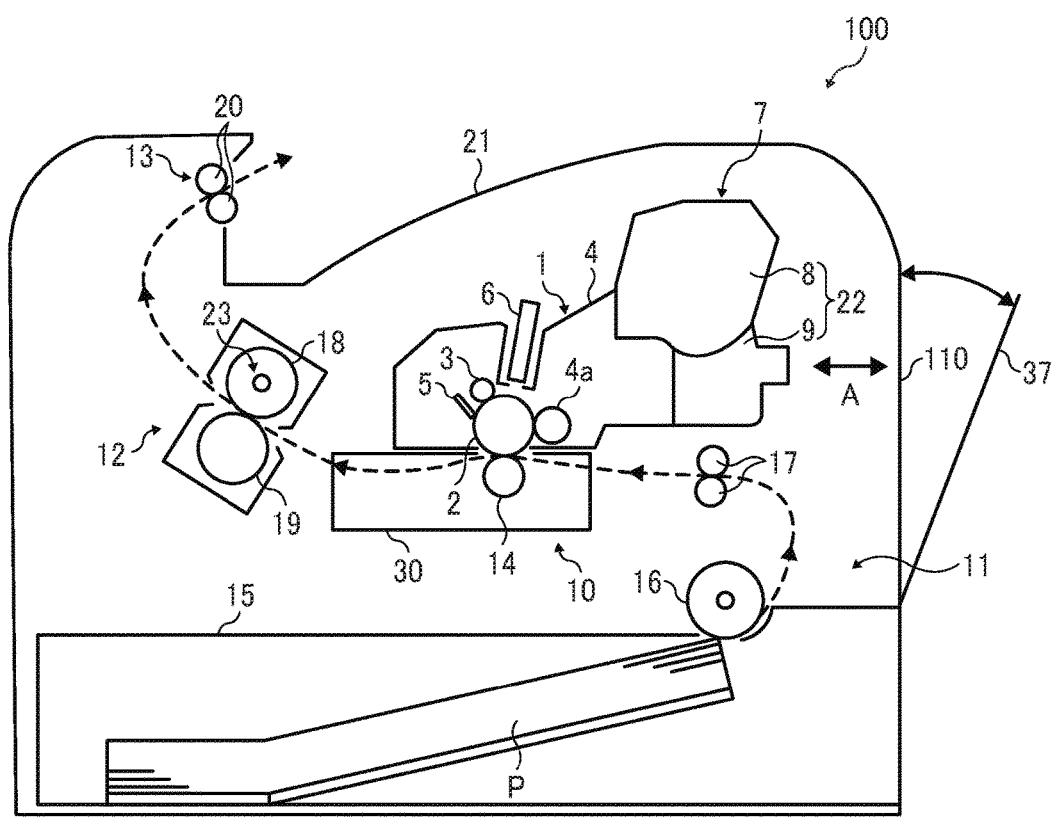
FIG. 1 is a schematic diagram illustrating an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Now, a description is given of an electrophotographic printer that functions as an electrophotographic image forming apparatus for forming images by electrophotography.

It is to be noted that elements (for example, mechanical parts and components) having the same functions and shapes are denoted by the same reference numerals throughout the specification and redundant descriptions are omitted.

FIG. 1 is a schematic diagram illustrating an image forming apparatus 100 according to an embodiment of this disclosure.

The image forming apparatus 100 may be a copier, a facsimile machine, a printer, a multifunction peripheral or a multifunction printer (MFP) having at least one of copying, printing, scanning, facsimile, and plotter functions, or the like. According to the present example, the image forming apparatus 100 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

The image forming apparatus 100 according to the present embodiment of this disclosure, illustrated in FIG. 1, is a monochrome printer. The image forming apparatus 100 includes an apparatus body 110 and a process cartridge 1 that is disposed detachably attached to the apparatus body 110.

The process cartridge 1 functions as an image forming device to form an image on a recording medium (or a sheet) and includes a photoconductor 2, a charging roller 3, a developing device 4, and a cleaning blade 5. The photoconductor 2 functions as an image bearer to bear an image on a surface thereof. The charging roller 3 functions as a charging device to uniformly charge the surface of the photoconductor 2. The developing device 4 develops the image formed on the surface of the photoconductor 2 into a visible image. The cleaning blade 5 functions as a cleaning device to clean the surface of the photoconductor 2.

The image forming apparatus 100 further includes an LED (light emitting diode) head array 6 disposed near the photoconductor 2. The LED head array 6 functions as an exposing device to expose the surface of the photoconductor 2.

The process cartridge 1 includes a toner cartridge 7 that functions as a developer container. The toner cartridge 7 is detachably attached to the process cartridge 1. The toner cartridge 7 includes a container body 22 in which a developer storing section 8 and a developer collecting section 9 are provided as a single unit. The developer storing section 8 accommodates toner that functions as developer to be supplied to the developing device 4. The developer collecting section 9 collects toner (used toner or waste toner) that has been removed by the cleaning blade 5.

The image forming apparatus 100 further includes a transfer device 10, a sheet feeding device 11, a fixing device 12, and a sheet discharging device 13. The transfer device 10 transfers the image formed on the surface of the photoconductor 2 onto a sheet P such as a transfer medium. The sheet feeding device 11 supplies and feeds the sheet P toward the transfer device 10. The fixing device 12 fixes the image transferred onto the sheet P to the sheet P. The sheet discharging device 13 outputs the sheet P outside the apparatus body 110 of the image forming apparatus 100.

The transfer device 10 includes a transfer roller 14. The transfer roller 14 functions as a transfer body rotatably disposed to a transfer frame 30. The transfer roller 14 is in contact with the photoconductor 2 in a state in which the process cartridge 1 is attached to the apparatus body 110 of the image forming apparatus 100. A transfer nip region is formed at a contact portion at which the photoconductor 2 and the transfer roller 14 contact to each other. In addition, the transfer roller 14 is connected to a power source, and a predetermined direct current (DC) voltage and/or an alternating current (AC) voltage are supplied to the transfer roller 14.

The sheet feeding device 11 includes a sheet feed tray 15 and a sheet feed roller 16. The sheet feed tray 15 contains the sheet P. The sheet feed roller 16 feeds the sheet P contained in the sheet feed tray 15. Further, a pair of registration rollers 17 is disposed downstream from the sheet feed roller 16 in a sheet conveying direction. The pair of registration rollers 17 functions as a pair of timing rollers to convey the sheet P to the transfer nip region at a proper timing of conveyance of the sheet P. It is to be noted that the sheet P is not limited to the above-described transfer medium but also includes thick paper, post card, envelope, plain paper, thin paper, coated paper, art paper, tracing paper, and the like. The sheet P further includes a non-paper material such as OHP sheet, OHP film, and any other sheet-shaped material on which an image can be formed.

The fixing device 12 includes a fixing roller 18 and a pressure roller 19. The fixing roller 18 is heated by an infrared heater 23 that is disposed inside the fixing roller 18. The pressure roller 19 is pressed toward the fixing roller 18 to contact the fixing roller 18. A fixing nip region is formed at a position where the fixing roller 18 and the pressure roller 19 contact with each other.

The sheet discharging device 13 includes a pair of sheet output rollers 20 that functions as a drive target body. After having been ejected to the outside of the apparatus body 110 of the image forming apparatus 100 by the pair of sheet output rollers 20, the sheet P is loaded on a sheet output tray 21 that has a concaved shape or a downwardly curved shape on an upper face of the apparatus body 110 of the image forming apparatus 100.

Next, a description is given of basic functions of the image forming apparatus 100 according to the present embodiment of this disclosure, with reference to FIG. 1.

When an image forming operation is started, the photoconductor 2 of the process cartridge 1 is rotated in a clockwise direction in FIG. 1, and the charging roller 3 uniformly charges the surface of the photoconductor 2 with a predetermined polarity. The LED head array 6 emits a light beam onto the charged face of the photoconductor 2 based on image data input from an external device, so that an electrostatic latent image is formed on the surface of the photoconductor 2.

The developing device 4 includes a developing roller 4a and supplies toner by the developing roller 4a onto the electrostatic latent image formed on the photoconductor 2, thereby developing (visualizing) the electrostatic latent image into a visible image as a toner image.

Further, as the image forming operation is started, the transfer roller 14 is rotated and a predetermined direct current (DC) and/or the alternating current (AC) are supplied to the transfer roller 14. As a result, a transfer electric field is formed between the transfer roller 14 and the opposing photoconductor 2.

By contrast, the sheet feed roller 16 that is disposed in a lower portion of the apparatus body 110 of the image forming apparatus 100 is driven and rotated to feed the sheet P from the sheet feed tray 15. Conveyance of the sheet P fed from the sheet feed tray 15 is temporarily interrupted by the pair of registration rollers 17.

Thereafter, at the predetermined timing, the pair of registration rollers 17 starts rotating again. Then, in synchronization with movement of the toner image formed on the surface of the photoconductor 2 reaching the transfer nip region, the sheet P is conveyed to the transfer nip region. Due to the transfer electric field, the toner image formed on the surface of the photoconductor 2 is collectively transferred onto the sheet P. After transfer of the toner image from the photoconductor 2 onto the sheet P, residual toner that has failed to be transferred onto the sheet P remains on the surface of the photoconductor 2. Therefore, the cleaning blade 5 removes the residual tone from the surface of the photoconductor 2. The removed toner is conveyed and collected into the developer collecting section 9 of the container body 22.

Thereafter, the sheet P having the toner image thereon is conveyed to the fixing device 12, where the toner image is fixed to the sheet P. Then, the sheet P is ejected by the pair of sheet output rollers 20 to the outside of the apparatus body 110 of the image forming apparatus 100 and is stocked onto the sheet output tray 21.

The image forming apparatus 1000 further includes a cover 37 on a side face (the right side face in FIG. 1) of the apparatus body 110. The cover 37 opens and closes in a direction indicated by arrow in FIG. 1. By opening the cover 37, the process cartridge 1 can be removed from the apparatus body 110 of the image forming apparatus 100.

Figure 2:
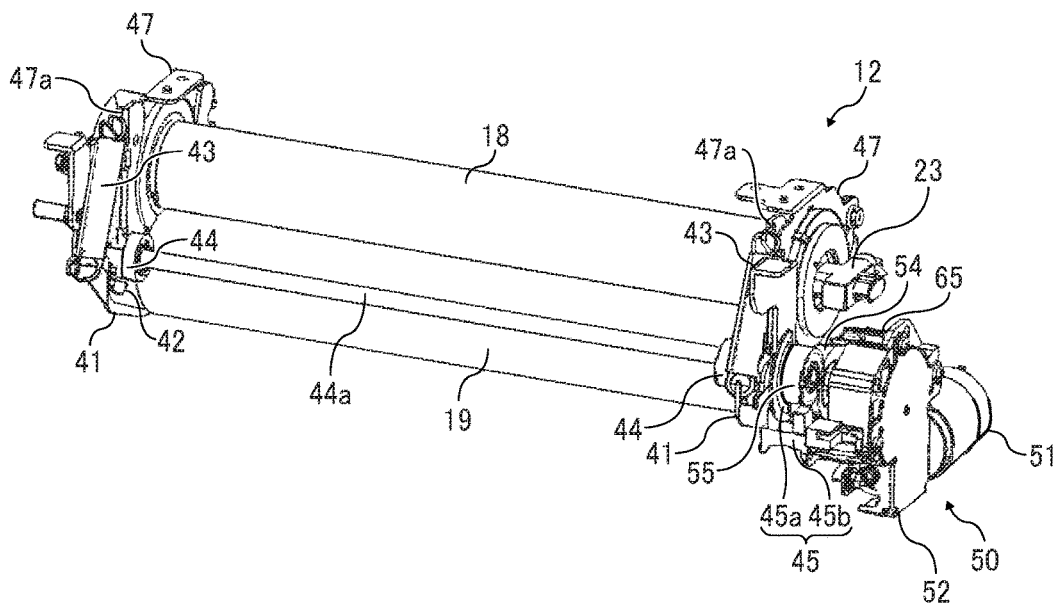
FIG. 2 is a perspective view illustrating a fixing device included in the image forming apparatus of FIG. 1.
Figure 3:
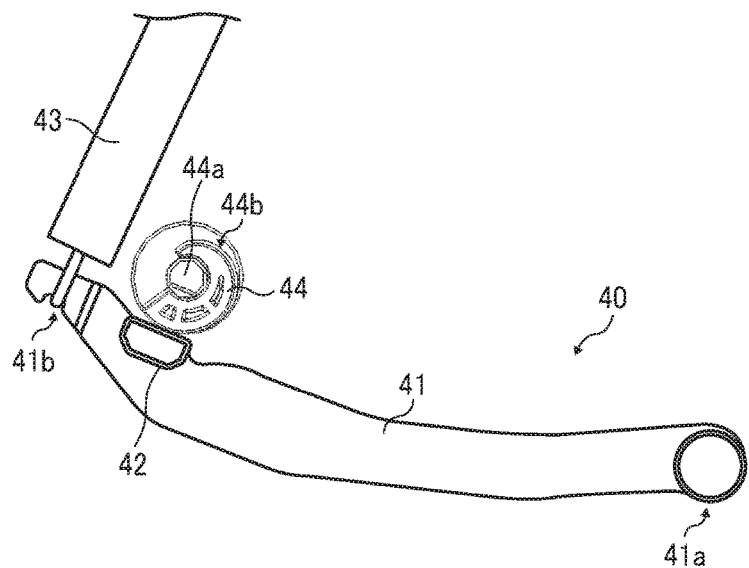
FIG. 3 is a diagram illustrating a main part of a pressure adjusting mechanism included in the fixing device.
Figure 4:
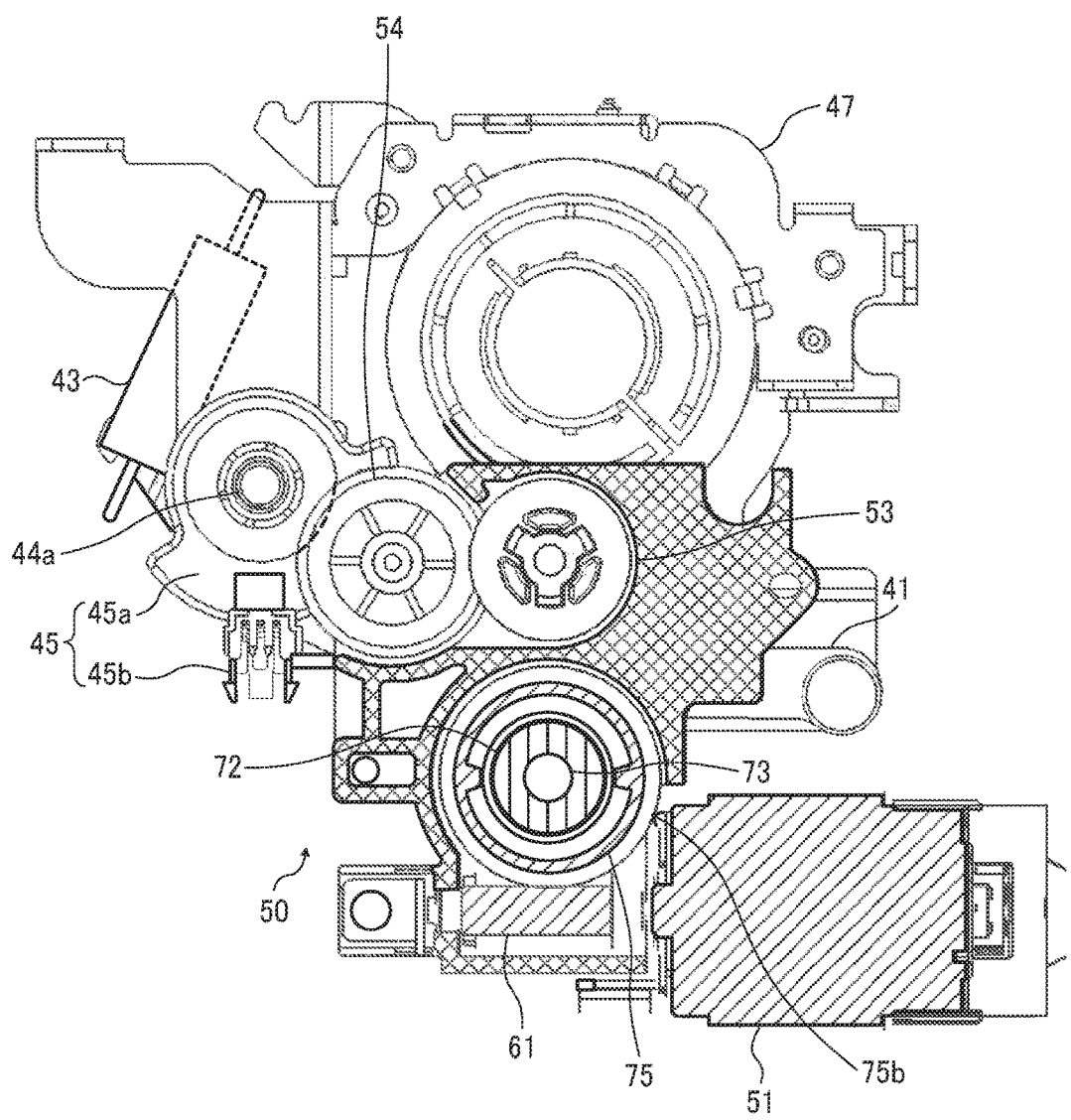
FIG. 4 is a cross sectional view illustrating the fixing device, viewed in a direction perpendicular to the axial direction of a far side end thereof.
Figure 5:
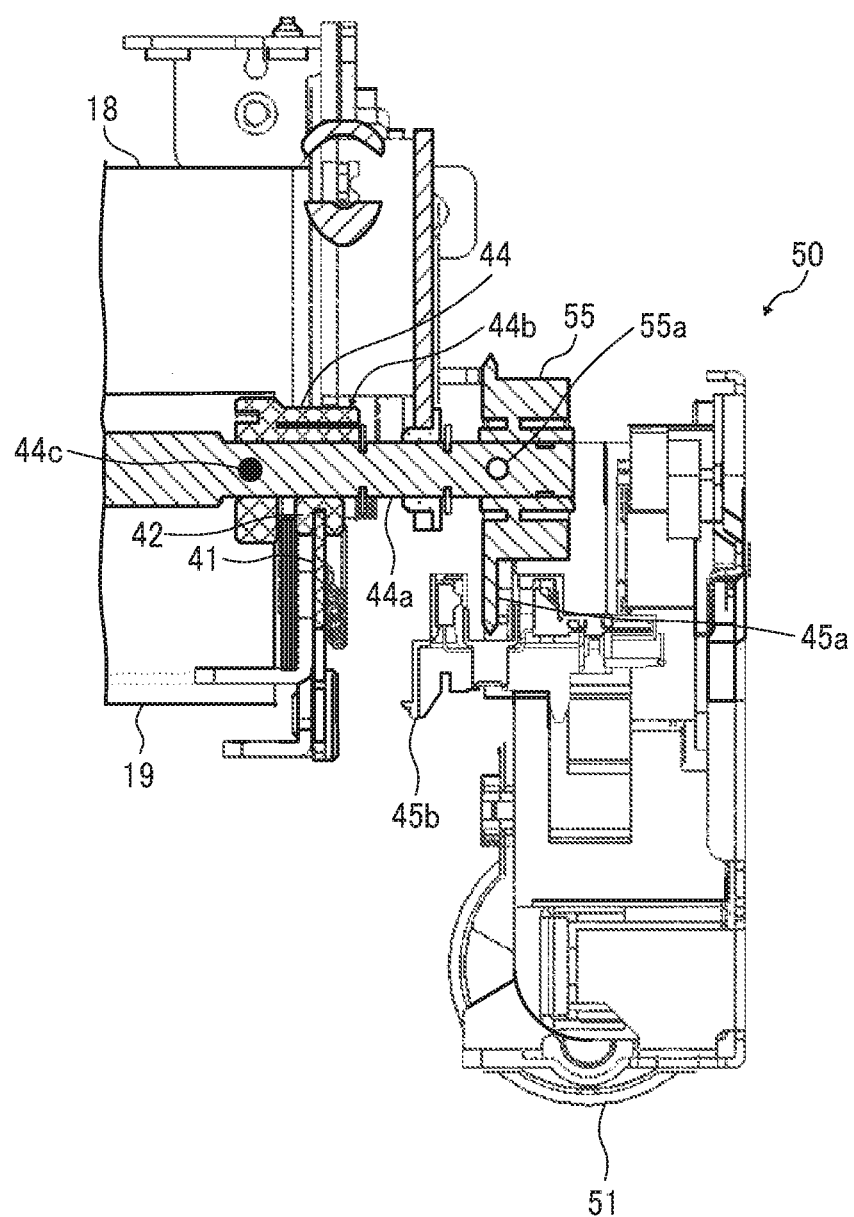
FIG. 5 is a cross sectional view illustrating the fixing device, viewed in a direction perpendicular to a sheet conveying direction of a sheet at the far side end.

FIG. 2 is a perspective view illustrating the fixing device 12 included in the image forming apparatus 100 of FIG. 1. FIG. 3 is a diagram illustrating a main part of a pressing force adjusting mechanism 40 included in the fixing device 12. FIG. 4 is a cross sectional view illustrating the fixing device 12, viewed in a direction perpendicular to the axial direction of a far side end of the fixing device 12. FIG. 5 is a cross sectional view illustrating the fixing device 12, viewed in a direction perpendicular to a sheet conveying direction of the sheet P at the far side end of the fixing device 12.

The fixing device 12 includes the fixing roller 18, the pressure roller 19, and a pressure adjustment mechanism 40. The fixing roller 18 functions as a heater facing body and includes the infrared heater 23 therein, so that the infrared heater 23 applies heat to the fixing roller 18. The pressure roller 19 functions as a moving body to press the fixing roller 18 and form a fixing nip region with the fixing roller 18. The pressure adjustment mechanism 40 adjusts a pressing force applied to the pressure roller 19 against the fixing roller 18

The pressure adjustment mechanism 40 includes a pair of levers 41, a pair of springs 43, a pair of cams 44, and a drive device 50. The pair of levers 41 supports the pressure roller 19 to adjust the pressing force to approach and separate relative to the fixing roller 18. The pair of springs 43 functions as a biasing body to bias the pressure roller 19 toward the fixing roller 18 via the pair of levers 41. The pair of cams 44 that functions as a drive target body moves the pressure roller 19 against a biasing force applied by the pair of springs 43 via the pair of levers 41, in a direction to separate from the fixing roller 18. The drive device 50 drives the pair of cams 44.

The fixing roller 18 is rotatably supported by a pair of side plates 47 on both sides in an axial direction thereof. The pressure roller 19 is rotatably supported by the pair of levers 41 of the pressure adjustment mechanism 40 on both sides in an axial direction thereof. As illustrated in FIG. 3, a support shaft 41a is mounted on one end of each of the pair of levers 41 and is rotatably supported by the pair of side plates 47. A spring receiver 41b is mounted on an opposed end of each of the pair of levers 41. One end of the pair of springs 43 that functions as a biasing body is attached to the spring receiver 41b. As illustrated in FIG. 2, the opposed end of each of the pair of springs 43 is attached to a bearing 47a mounted on each of the pair of side plates 47. A cam bearing 42 is provided on the opposed end of each of the pair of levers 41. Each of the pair of cams 44 is in contact with the cam bearing 42.

The pair of cams 44 is mounted on a cam shaft 44a with a parallel pin 44c (see FIG. 5) so that the pair of cams 44 rotates together with the cam shaft 44a as a single unit. A cam gear 55 is mounted on the cam shaft 44a at a far end (the right side end in FIG. 2) of the cam shaft 44a with a parallel pin 55a so that the cam gear 55 meshes with a second output gear 54 of the drive device 50 rotates together with the cam shaft 44a as a single unit.

The rotation angle detection mechanism 45 that detects the rotation angle of the pair of cams 44 includes a feeler 45a. The feeler 45a of the rotation angle detection mechanism 45 is mounted on the cam gear 55. The rotation angle detection mechanism 45 further includes an optical sensor 45b. The optical sensor 45b that detects the feeler 45a is disposed on a far side plate of the pair of side plates 47. The feeler 45a is a semicircle shape. The optical sensor 45b is a photointerrupter (a transmission optical sensor).

Figure 6A:
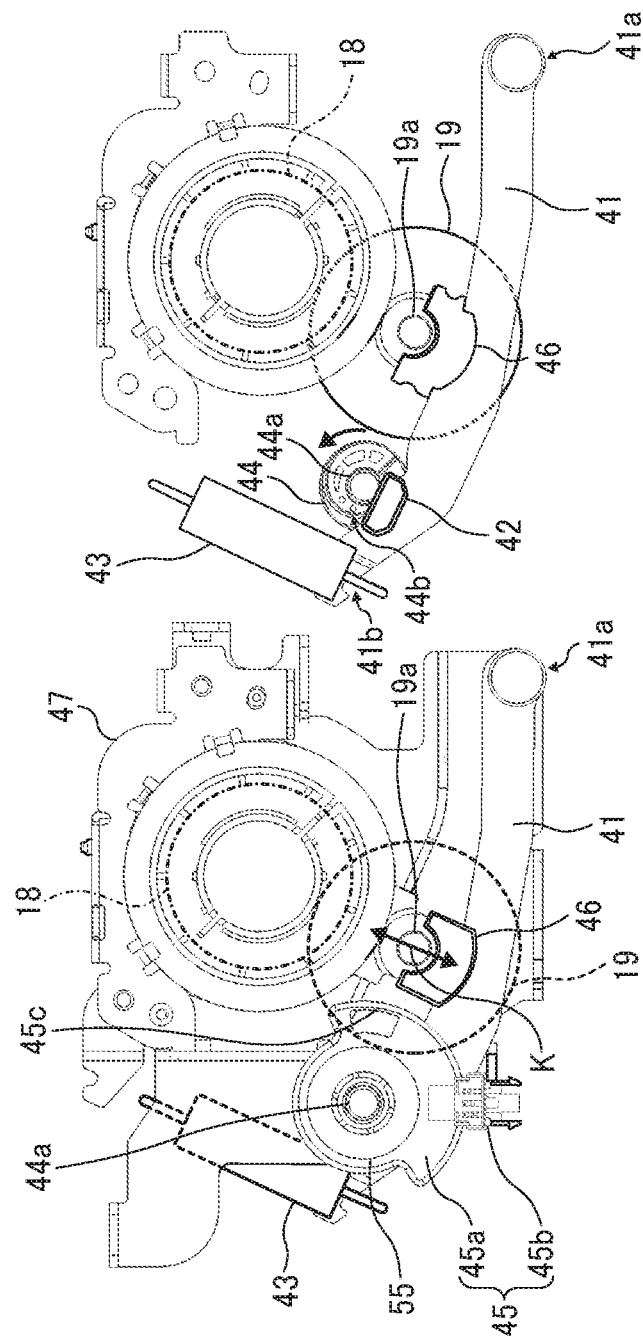
FIG. 6A is a diagram illustrating a state in which a pressure roller is in a press in state.
Figure 6B:
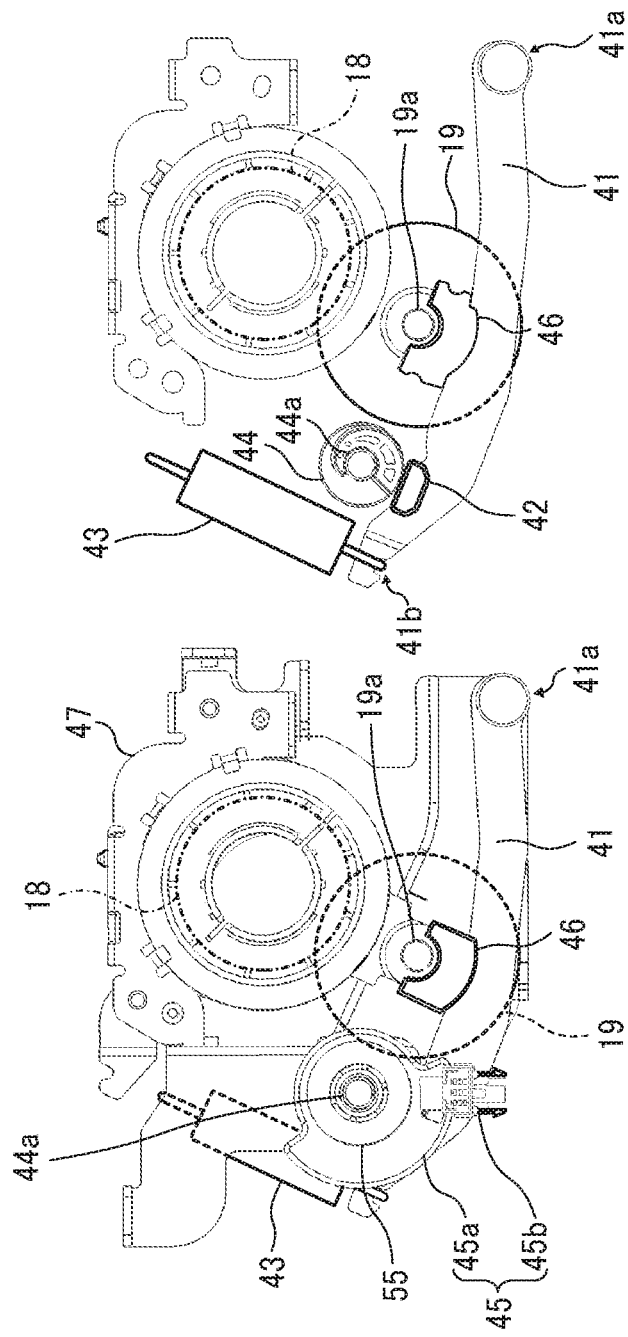
FIG. 6B is a diagram illustrating a state in which the pressure roller is in a non-press in state.

FIG. 6A is a diagram illustrating a state in which the pressure roller 19 is in a press in state. FIG. 6B is a diagram illustrating a state in which the pressure roller 19 is in a non-press in state. The press in state of the rotation angle detection mechanism 45 is illustrated on the left side of FIG. 6A. The non-press in state of the rotation angle detection mechanism 45 is illustrated on the left side of FIG. 6B.

As illustrated in FIGS. 6A and 6B, the pair of levers 41 is in contact with a bearing 46 that receives a shaft 19a of the pressure roller 19. The bearing 46 is reciprocally supported by the pair of side plates 47 in a direction indicated by arrow K in FIGS. 6A and 6B. Further, the feeler 45a of the rotation angle detection mechanism 45 is a semicircle shape and has an opening 45c at one end side thereof in the rotational direction.

As illustrated in FIG. 6A, in the press in state, the feeler 45a is located between a light emitting element and a light receiving element of the optical sensor 45b, so that the feeler 45a interrupts the optical path formed therebetween. Further, in the press in state, the bottom dead center of the pair of cams 44 is in contact with the cam bearing 42.

As the drive device 50 is driven to change the state of the rotation angle detection mechanism 45 from the press in state to the non-press in state, the pair of cams 44 and the feeler 45a rotate in the counterclockwise direction in FIGS. 6A and 6B. Consequently, the pair of cams 44 in the state as illustrated in FIG. 6A presses the cam bearing 42 downwardly in FIG. 6A, against the biasing force applied by the pair of springs 43. According to this action, the pair of levers 41 rotates about the support shaft 41a in the counterclockwise direction in FIG. 6A. Then, the pressure roller 19 that functions as a moving body is moved by a reaction force applied by the fixing roller 18, in a direction to separate from the fixing roller 18, resulting in a reduction in the pressing force of the pressure roller 19 to the fixing roller 18.

As illustrated in FIG. 6B, as the top dead center of the pair of cams 44 contacts the cam bearing 42, the optical sensor 45b is brought to a position between the light emitting element and the light receiving element of the optical sensor 45b, so that the light receiving element of the optical sensor 45b detects light emitted from the light emitting element. According to this action, it is detected that the pressure roller 19 has retreated to a non-pressure position.

In the present embodiment, in a case in which a paper jam occurs in the fixing device 12, the pressure adjustment mechanism 40 changes the state to the non-press in state. Consequently, a sheet or sheets jammed in the fixing nip region can be removed from the fixing nip region easily.

Further, in a case in which the image forming apparatus 100 is changed from a standby state to a sleep mode or in a case in which the power source is turned off, the pressure adjustment mechanism 40 reduces a pressing force of the pressure roller 19 to the fixing roller 18, thereby preventing occurrence of creep (deformation) at the fixing nip region. Further, in a case in which a thick paper such as an envelope is conveyed, the pressure adjustment mechanism 40 reduces the pressing force of the pressure roller 19 to the fixing roller 18. By so doing, a fixing operation can be performed without causing creases in the thick paper.

When transferring from the non-press in state to the press in state, a drive motor 51 is driven to rotate in a direction opposite the rotational direction to transfer from the press in state to the non-press in state. Consequently, the pair of cams 44 rotates in the clockwise direction, and the pair of levers 41 rotates due to the biasing force of the pair of springs 43, about the support shaft 41a in the clockwise direction in FIG. 6B. Accordingly, the pressure roller 19 is brought to press the fixing roller 18. Further, the feeler 45a enters between the light receiving element and the light emitting element of the optical sensor 45b. After a predetermined period of time has elapsed since the light receiving element stopped detecting light emitted from the light emitting element, it is determined that the pressing force has reached a specified value and the driving of the drive motor 51 is stopped.

Figure 7:
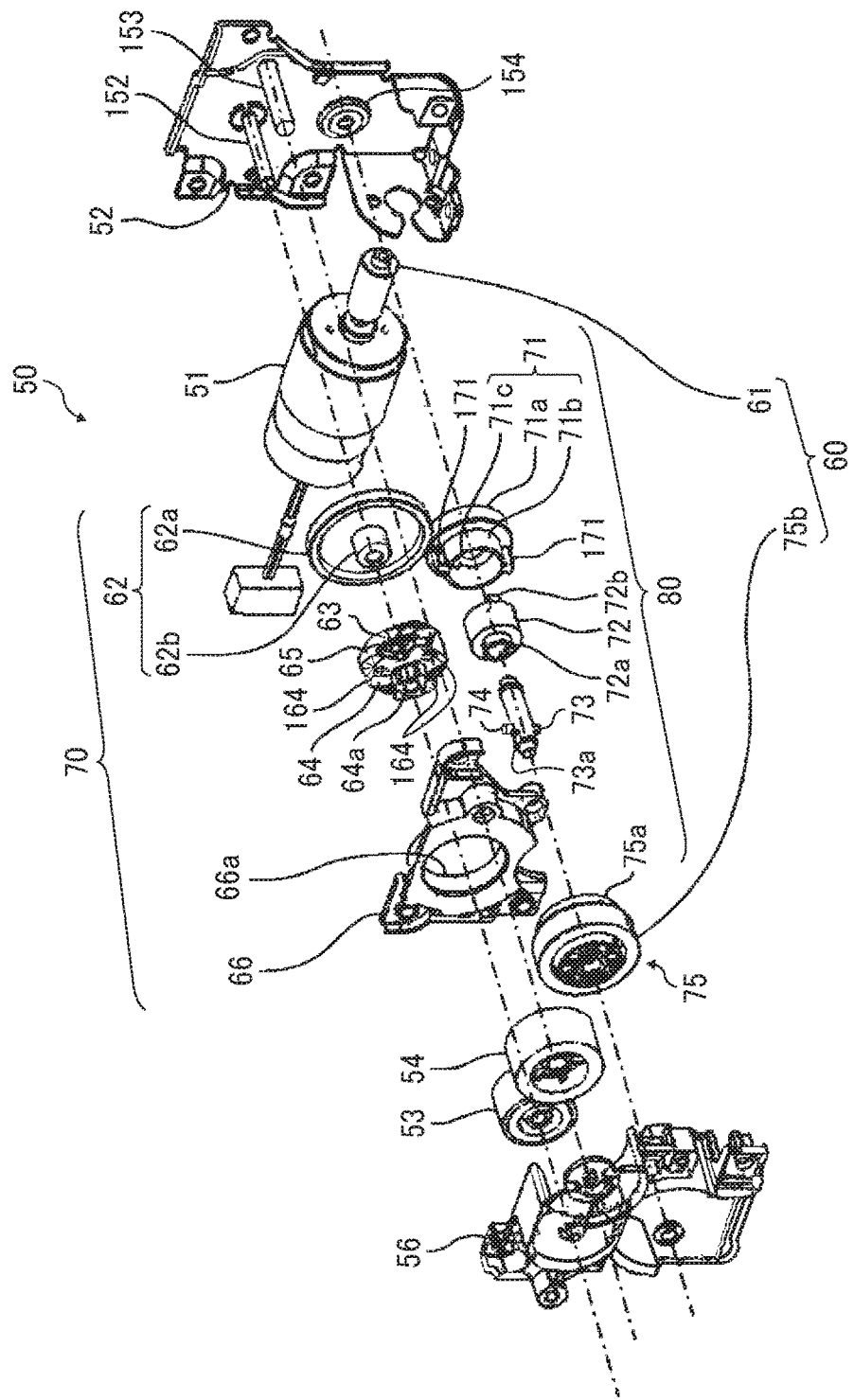
FIG. 7 is an exploded perspective view illustrating a drive device of the pressure adjustment mechanism.
Figure 8:
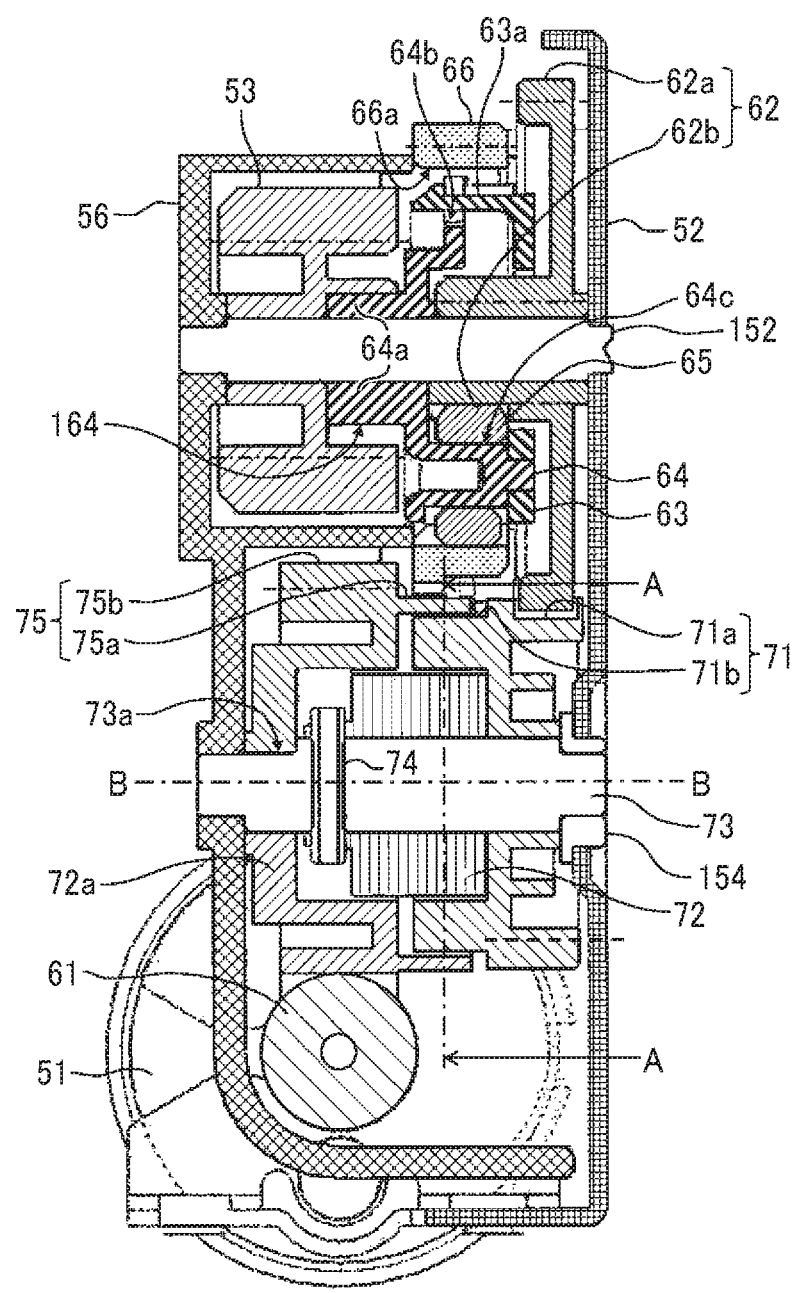
FIG. 8 is a cross sectional view illustrating the drive device, cut parallel along an axial direction thereof.
Figure 9:
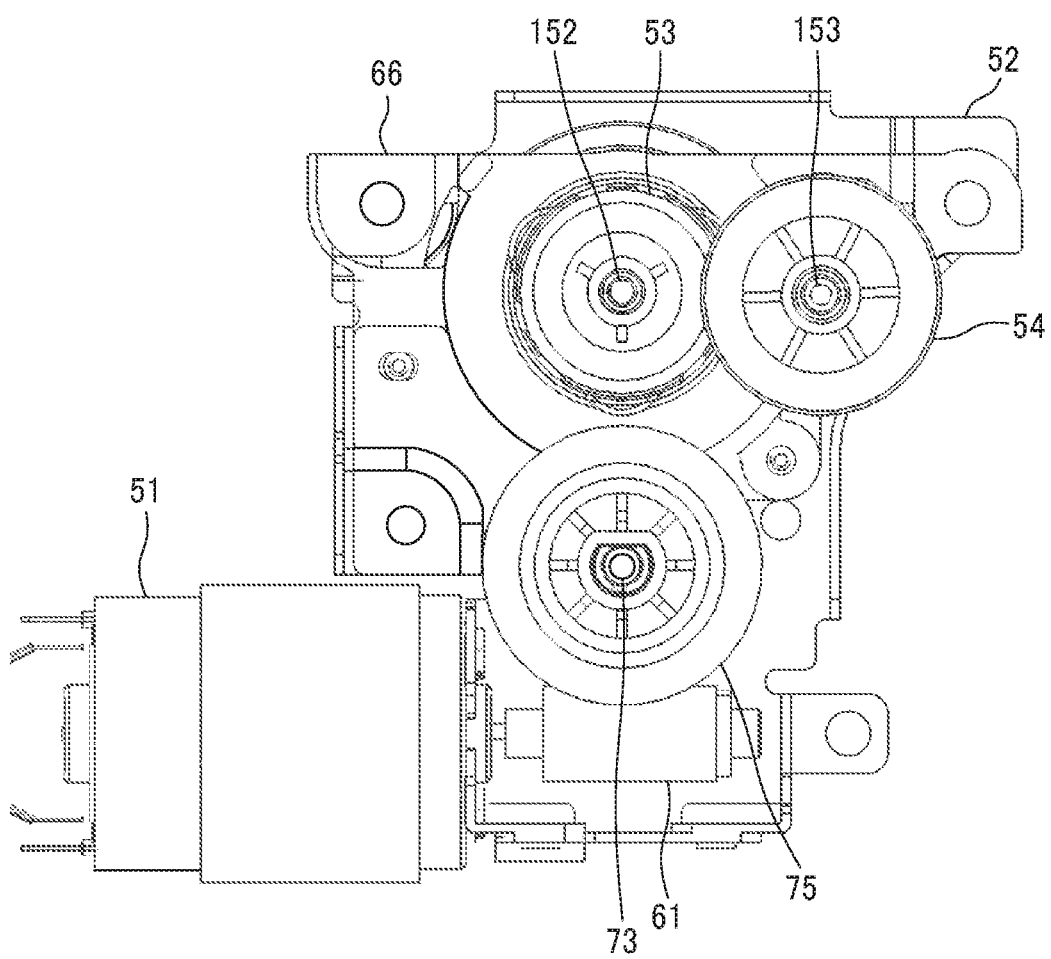
FIG. 9 is a front view illustrating the drive device, viewed from the left side of FIG. 8, after a second housing is removed.
Figure 10:
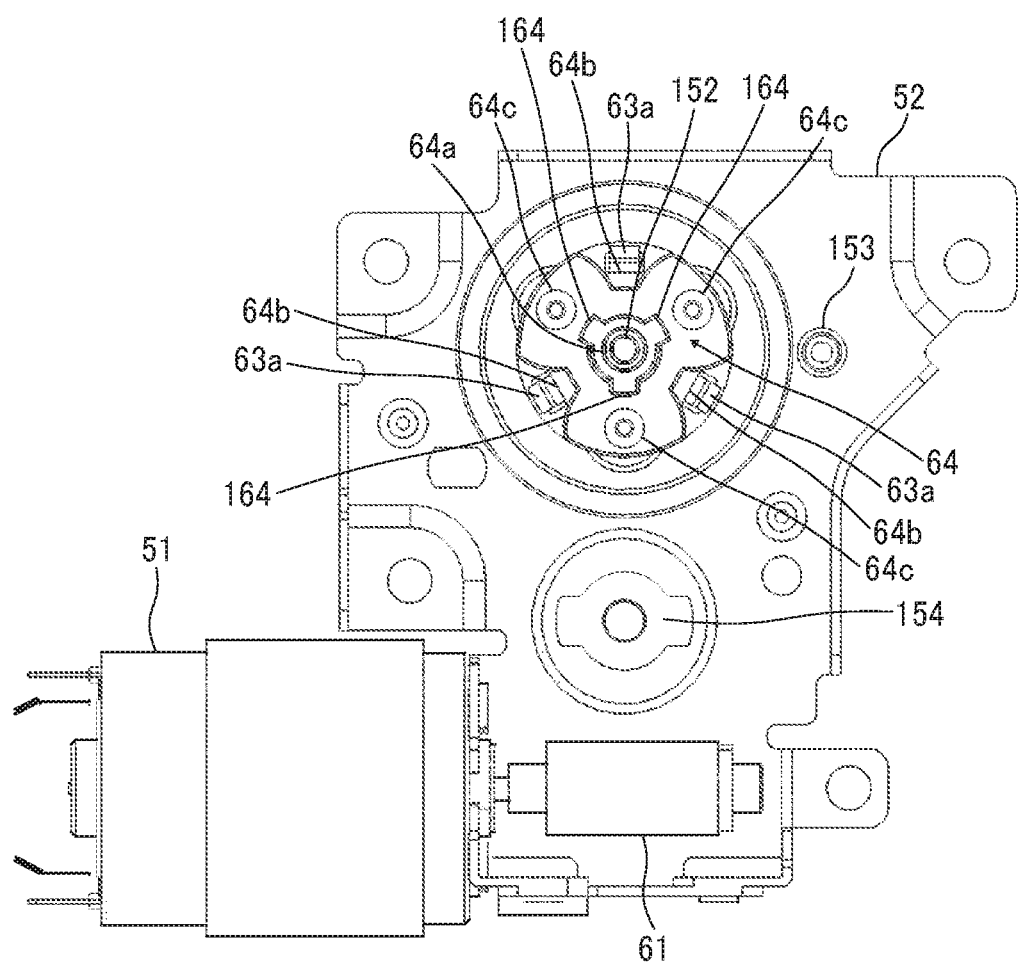
FIG. 10 is a front view illustrating the drive device of FIG. 9, after a worm wheel, a first housing, a drive shaft, a first output gear and a second output gear are further removed.

FIG. 7 is an exploded perspective view illustrating the drive device 50 included in the pressure adjustment mechanism 40. FIG. 8 is a cross sectional view illustrating the drive device 50, cut parallel along an axial direction. FIG. 9 is a front view illustrating the drive device 50, viewed from the left side of FIG. 8, after a second housing 56 is removed from the drive device 50. FIG. 10 is a front view illustrating the drive device 50 of FIG. 9, after a worm wheel 75, a first housing 66, a drive shaft 73, a first output gear 53 and the second output gear 54 are further removed from the drive device 50.

The drive device 50 according to the present embodiment includes the drive motor 51, a worm gear 60, a planetary gear mechanism 70 and a load applying device 80. The worm gear 60, the planetary gear mechanism 70 and the load applying device 80 are provided to a drive transmission device 90. A driving force exerted by the drive motor 51 is transmitted to the worm gear 60, the load applying device 80, and the planetary gear mechanism 70 in this order.

In the present embodiment, the drive motor 51 is a brush motor that is less expensive and more compact than a brushless motor. A worm 61 of the worm gear 60 is mounted on a motor shaft of the drive motor 51, so that the worm 61 is rotated together with the motor shaft of the drive motor 51 as a single unit. The worm 61 is meshed with a worm wheel 75. The worm wheel 75 is rotatably supported by a drive shaft 73 that is secured to the bracket 52 via a bearing 154.

Figure 11A:
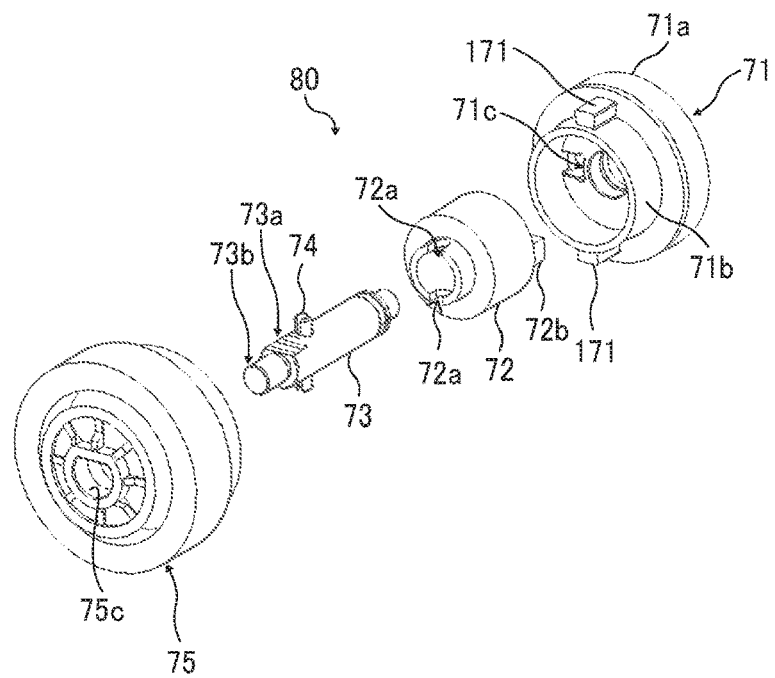
FIG. 11A is an exploded perspective view illustrating a load applying device.
Figure 11B:
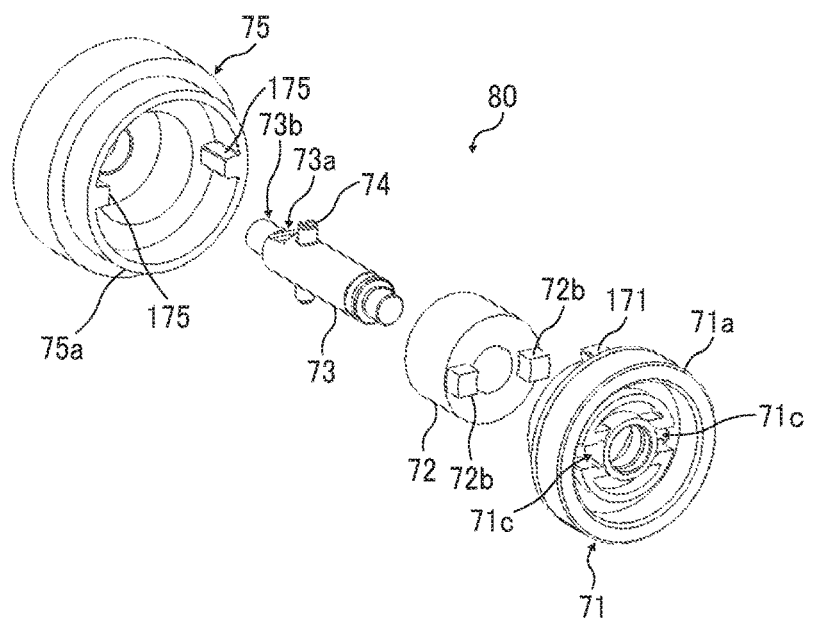
FIG. 11B is another exploded perspective view illustrating the load applying device, viewed from a different angle from FIG. 11A.
Figure 12:
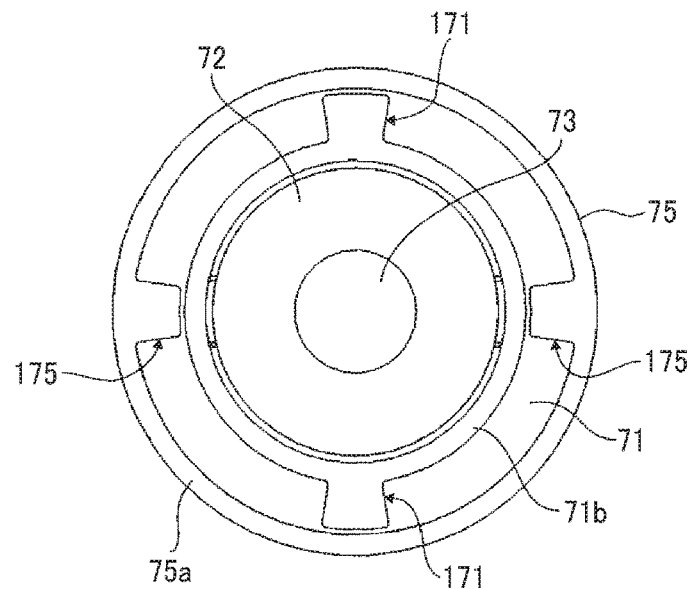
FIG. 12 is a cross sectional view illustrating the drive 73 unit of FIG. 8, along a line A-A of FIG. 8.
Figure 13:
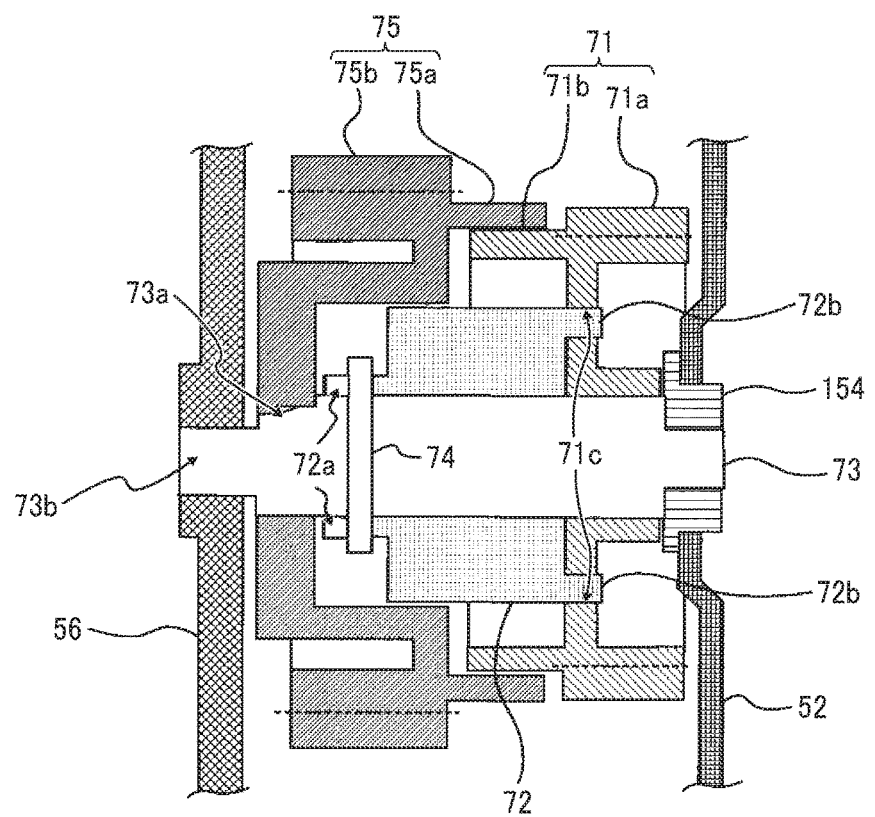
FIG. 13 is a cross sectional view illustrating the drive unit of FIG. 8, along a line B-B of FIG. 8.

FIG. 11A is an exploded perspective view illustrating the load applying device 80. FIG. 11B is another exploded perspective view illustrating the load applying device 80, viewed from a different angle from FIG. 11A. FIG. 12 is a cross sectional view illustrating the drive device 50 of FIG. 8, along a line A-A of FIG. 8. FIG. 13 is a cross sectional view illustrating the drive device 50 of FIG. 8, along a line B-B of FIG. 8.

The load applying device 80 includes a drive side coupling 75a, a driven side coupling 71b, the drive shaft 73, and a torque limiter 72 that functions as a load applying body. The drive side coupling 75a is mounted on the worm wheel 75. As illustrated in FIGS. 11B and 12, drive side engagement projections 175 are provided on an inner circumferential surface of the drive side coupling 75a, at intervals of an angle of 180 degrees.

The worm wheel 75 is mounted on the drive shaft 73 so that the worm wheel 75 rotates together with the drive shaft 73 as a single unit. Specifically, the drive shaft 73 has a press-in portion 73a as a notch having a D-shaped cross section and the worm wheel 75 includes a substantially elastically deformable material such as resin and has a press-in hole 75c as an opening having a D-shaped cross section to be pressed into the press-in portion 73a. The press-in hole 75c of the worm wheel 75 is pressed in and inserted into the press-in portion 73a of the drive shaft 73 while being expanded (being deformed widely). By so doing, the worm wheel 75 is attached to the drive shaft 73 so as to be rotated together with the drive shaft 73 as a single unit. It is to be noted that details of the press-in portion 73a and the press-in hole 75c are described below.

One end of the drive shaft 73 is rotatably supported by a bracket 52 via a bearing 154. The drive shaft 73 has an opposed end on which a support 73b that is rotatably supported by the second housing 56 is mounted. The support 73b has a diameter smaller than the diameter of the press-in portion 73a.

The torque limiter 72 that functions as a load applying body and a drive coupling member 71 are mounted on the drive shaft 73. Two cut portions 72a are provided at an end of the torque limiter 72 on the side of the worm wheel 75. The two cut portions 72a, each of which extending in the axial direction, are located at intervals of an angle of 180 degrees in the direction of rotation of the torque limiter 72. A parallel pin 74 is inserted into the drive shaft 73, and is fitted and inserted into the cut portions 72a of the torque limiter 72.

Two engagement projections 72b are provided at an opposed end of the torque limiter 72 on the side of the drive coupling member 71. The two engagement projections 72b, each of which extending in the axial direction, are located at intervals of an angle of 180 degrees in the direction of rotation of the torque limiter 72. These engagement projections 72b are fitted and inserted into an engagement opening 71c that is provided to the drive coupling member 71 on an opposing face to the torque limiter 72.

The drive coupling member 71 is rotatably supported by the drive shaft 73 and includes the driven side coupling 71b and a gear portion 71a. The driven side coupling 71b is an outer diameter for entering into the driven side coupling 75a. On an outer circumferential surface of the driven side coupling 71b, two driven side engagement projections 171 are formed at intervals of an angle of 180 degrees in the direction of rotation of the driven side coupling 71b.

As illustrated in FIGS. 7 and 8, the planetary gear drive transmission member 62 is rotatably supported by a first support shaft 152 that is secured to the bracket 52 by caulking. A sun gear 62b of the planetary gear mechanism 70 is formed on the planetary gear drive transmission member 62.

The planetary gear mechanism 70 includes the sun gear 62b, three planetary gears 65, a carrier 64, an internal gear 66a, and a carrier holder 63. The three planetary gears 65 mesh with the sun gear 62b. The carrier 64 rotatably supports the three planetary gears 65. The internal gear 66a meshes with the three planetary gears 65. The carrier holder 63 is attached to the carrier 64 to hold the planetary gears 65.

The planetary gears 65 are rotatably supported by respective planetary gear support shafts 64c mounted on the carrier 64 at equal intervals in a direction of rotation of the carrier 64. Snap fits 63a is mounted on the carrier holder 63 to be attached to the carrier 64. While elastically deforming the snap fits 63a, claws at the leading edges of the snap fits 63a are inserted to pass through respective engaging holes 64*b* of the carrier 64. By so doing, the carrier holder 63 is attached to the carrier 64. Accordingly, the planetary gears 65 are held by the carrier 64.

The internal gear 66*a* is mounted on a first housing 66. The first housing 66 is combined with the bracket 52 and the second housing 56, thereby covering the worm gear 60, the planetary gear mechanism 70 and the load applying device 80.

As illustrated in FIGS. 7, 8 and 10, the carrier 64 includes a support target portion 64*a* having a cylindrical shape, to be supported by the first support shaft 152. By inserting the support target portion 64*a* into the first support shaft 152, the carrier 64 is rotatably supported by the first support shaft 152. Three drive coupling projections 164 are provided on the outer circumferential surface of the support target portion 64*a*, at equal intervals having an angle of 120 degrees. The three drive coupling projections 164 are drivingly coupled to the first output gear 53 that is rotatably supported by the first support shaft 152. By contrast, the first output gear 53 has a cylindrical portion on an opposing face to the carrier 64. A support target portion 64*a* is inserted into the circumferential portion of the first output gear 53. Three grooves into which the drive coupling projections 164 are fitted and inserted are provided on the inner circumferential surface of the cylindrical portion of the first output gear 53, at equal intervals having an angle of 120 degrees. Accordingly, the driving force is transmitted from the carrier 64 to the first output gear 53.

The second output gear 54 is meshed with the first output gear 53. The second output gear 54 is rotatably supported by a second support shaft 153 that is secured to the bracket 52 by caulking. The second output gear 54 is meshed with the cam gear 55, as illustrated in FIG. 2.

As the drive motor 51 rotates, the worm gear 60 reduces the speed of transmission of the driving force. Due to the driving force having the reduced speed reduced by the worm gear 60, the drive side coupling 75*a* and the drive shaft 73 rotate. When the drive side engagement projection 175 of the drive side coupling 75*a* is not in contact with the driven side engagement projection 171, the drive torque of the drive motor 51 is added to the torque limiter 72 via the drive shaft 73. As the drive torque is added to the torque limiter 72, the torque limiter 72 is operated to interrupt the transmission of the driving force from the torque limiter 72 to the drive coupling member 71, and therefore the drive coupling member 71 is prevented from rotating.

When the drive side engagement projection 175 of the drive side coupling 75*a* contacts the driven side engagement projection 171, the driving force of the drive motor is transmitted from the drive side coupling 75*a* to the driven side coupling 71*b*, thereby rotating the drive coupling member 71. Then, the driving force is transmitted from the gear portion 71*a* of the drive coupling member 71 to the input gear 62*a* of the planetary gear drive transmission member 62. Consequently, the sun gear 62*b* of the planetary gear mechanism 70 rotates.

As the sun gear 62*b* rotates, the planetary gears 65 that mesh with the sun gear 62*b* revolve around the sun gear 62*b* while rotating. Due to revolution of the planetary gears 65 around the sun gear 62*b*, the carrier 64 is rotated, and the first output gear 53 that is engaged with the carrier 64 is rotated together with the carrier 64. Then, the driving force is transmitted to the second output gear 54 that is meshed with the first output gear 53, and therefore the pair of cams 44 is rotated via the cam gear 55, as illustrated in FIG. 2.

As described above, when reducing the pressing force of the pressure roller 19 to the fixing roller 18, the pair of cams 44 presses the pair of levers 41 downwardly against the biasing force of the pair of springs 43. As a result, a load torque of the pair of cams 44 increases. Further, as the opposed end of the pair of levers 41 is pressed downwardly in FIG. 3, the pair of springs 43 extends, and therefore the biasing force of the pair of springs 43 increases. Consequently, the load torque of the pair of cams 44 increases. Accordingly, as the pressing force of the pressure roller 19 to the fixing roller 18 decreases, the load torque of the pair of cams 44 increases.

Now, a description is given of a comparative fixing device having a drive transmission mechanism that transmits a driving force applied by a drive motor of a drive device to a pair of cams. When the drive transmission mechanism of the comparative fixing device includes a gear train that transmits the driving force by meshing of multiple external gears, a sufficient reduction ratio cannot be obtained. Therefore, the drive motor employs a motor having a large drive torque, so that an output torque to be output to the pair of cams becomes greater than the load torque of the pair of cams. Consequently, a pair of levers can be rotated against the biasing force of the pair of springs. However, such a drive motor having a large drive torque is large in size and expensive. As a result, the size and cost of an image forming apparatus that includes the comparative fixing device provided with the drive transmission mechanism increase.

In order to address this inconvenience, the drive transmission device 90 of the drive device 50 according to the present embodiment has a configuration to obtain a relatively high reduction ratio using the worm gear 60 and the planetary gear mechanism 70. Thus, a relatively high reduction ratio can be obtained as described above, even when the drive motor 51 having a relatively small drive torque is used, the output torque to the pair of cams 44 can be made greater than the load torque of the pair of cams 44. Accordingly, even when the drive motor 51 employs a less expensive and compact brush motor having a relatively small torque, the drive motor 51 can rotate the pair of cams 44 against the biasing force of the pair of springs 43 preferably, and the pressing force of the pressure roller 19 to the fixing roller 18 can be adjusted reliably.

Further, the drive transmission device 90 of the drive device 50 according to the present embodiment includes the worm gear 60 and the planetary gear mechanism 70. According to this configuration, a relatively large reduction ratio can be obtained without using gears having a large diameter. Therefore, when compared with a configuration in which a gear train is employed to obtain a large reduction ratio, the configuration according to the present embodiment can prevent or restrain an increase in size of the image forming apparatus 100.

Further, in the present embodiment, a high reduction ratio can be obtained, and therefore the angle of rotation of the pair of cams 44 to the amount of driving force of the drive motor 51 can be relatively small. Accordingly, the angle of rotation of the pair of cams 44 can be adjusted finely, and therefore fine adjustment of the pressing force can be performed.

Further, in the planetary gear mechanism 70 according to the present embodiment, the sun gear 62*b* functions as an input portion (a driving portion), the internal gear 66*a* functions as a fixed portion, and the carrier 64 functions as an output portion (a driven portion). By setting the sun gear 62*b* as the input portion, the internal gear 66*a* as the fixed portion, and the carrier 64 as the output portion, the planetary gear mechanism 70 according to the present embodiment can obtain a maximum reduction ratio or a greatest reduction ratio.

Further, in assembly of the fixing device 12 to the apparatus body 110 of the image forming apparatus 100, even when the gear tip of the cam gear 55 that is mounted on the fixing device 12 is likely to abut against the gear tip of the second output gear 54 that is mounted on the apparatus body 110 of the image forming apparatus 100. In order to avoid this inconvenience, when the gear tip of the cam gear 55 hits the gear tip of the second output gear 54 mounted on the apparatus body 110 of the image forming apparatus 100, the second output gear 54 rotates to mesh the second output gear 54 and the cam gear 55 with each other. As described above, the drive device 50 (the drive transmission device 90) according to the present embodiment has the configuration to obtain a high reduction ratio. Therefore, a large amount of force is to be applied to rotate the drive motor 51 that remains stopped. Accordingly, the drive device 50 (the drive transmission device 90) may need to have a configuration to rotate the second output gear 54 to some extent without rotating the drive motor 51 that is not rotated.

In the present embodiment, as illustrated in FIG. 12, two driven side engagement projections 171 are provided at an interval of an angle 180 degrees in the rotation direction and two drive side engagement projections 175 are provided at an interval of an angle 180 degrees in the rotation direction. According to this configuration, the drive coupling member 71 is rotatable by substantially 180 degrees to the worm wheel 75. Consequently, by rotating the worm wheel 75 without rotating the drive motor 51 that is not rotated, the drive transmission member (i.e., the second output gear 54, the first output gear 53, each member of the planetary gear mechanism 70) disposed downstream from the worm wheel 75 in the drive transmission direction is rotated until the drive coupling member 71 is rotated by substantially half-turn, in other words, by substantially 180 degrees. By so doing, in assembly of the fixing device 12 to the apparatus body 110 of the image forming apparatus 100, when the gear tip of the cam gear 55 contacts the gear tip of the second output gear 54, the second output gear 54 rotates to mesh the second output gear 54 and the cam gear 55 with each other without rotating the drive motor 51 that is stopped. Accordingly, the fixing device 12 can be assembled to the apparatus body 110 of the image forming apparatus 100 easily, without a large amount of force to be applied in assembly of the fixing device 12.

Figure 14:
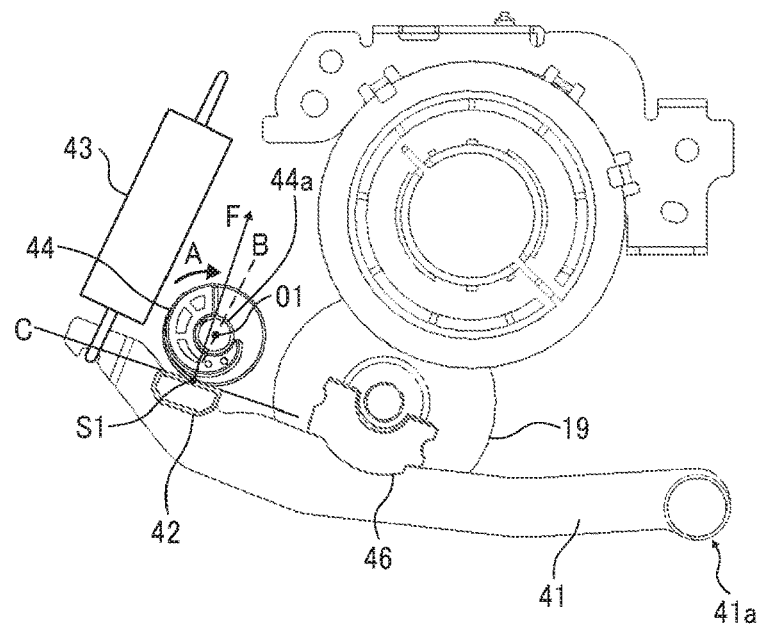
FIG. 14 is a diagram illustrating movement of a pressure roller from the non-press in state (with no pressure force applied) to the press in state.

FIG. 14 is a diagram illustrating movement of the pressure roller 19 from the non-press in state (with no pressing force applied) to the press in state.

When the pressure roller 19 is in the non-press in state, a top dead center of the pair of cams 44, where a distance from the axial center of the cam shaft 44a of the pair of cams 44 to the outer circumferential surface of the pair of cams 44 becomes the greatest distance, contacts the cam bearing 42, as illustrated in FIG. 6B. When the pair of cams 44 is rotated in a direction indicated by arrow A in FIG. 14 from this state, a biasing direction F of the springs 43 that is received by the pair of cams 44 via the cam bearing 42 is shifted to the rotation direction, relative to a line B that connects a point of contact S1 of the cam bearing 42 and a cam face 44b and a center of rotation O1 of the pair of cams 44. As a result, the biasing force F of the pair of springs 43 works to the pair of cams 44 in the rotation direction of the pair of cams 44, and the pair of cams 44 is pressed in the rotation direction, and therefore the pair of cams 44 is rotated faster than a rotation drive speed to rotate the pair of cams 44 by receiving the driving force from the drive motor 51.

Figure 15:
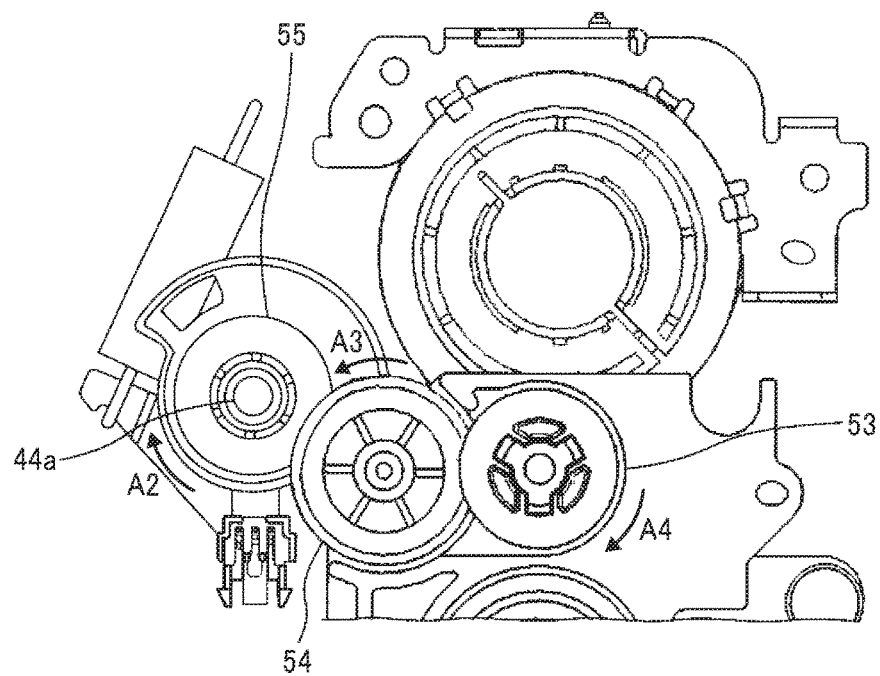
FIG. 15 is a diagram illustrating respective movements of gears of the drive device in a state in which a cam rotates at a rotation speed faster than a rotation speed by receiving a driving force from a drive motor by a biasing force of a spring.

FIG. 15 is a diagram illustrating respective movements of gears of the drive device 50 in a state in which the pair of cams 44 rotates at a rotation speed faster than the rotation speed by receiving the driving force from the drive motor 51 by the biasing force of the pair of springs 43.

There is a predetermined play such as a backlash in an engaging portion between drive transmitting members, such as a meshing portion of gears of the drive device 50. Therefore, when the pair of cams 44 is rotated faster than the rotation drive speed to rotate by receiving the biasing force of the pair of springs 43, the cam shaft 44a rotates, together with the pair of cams 44, faster than the rotation drive speed. As a result, as indicated by arrow A2 illustrated in FIG. 15, the cam gear 55 mounted on the cam shaft 44a rotates faster than the rotation drive speed. After the cam gear 55 has rotated faster by an amount of play (backlash) with the second output gear 54, a tooth of the cam gear 55 contacts a tooth of the second output gear 54, so that the second output gear 54 is pressed in the rotation direction. Consequently, as indicated by arrow A3 illustrated in FIG. 15, the second output gear 54 rotates by the amount of play with the first output gear 53 and presses the first output gear 53, so as to rotate the first output gear 53 faster than the rotation drive speed, as indicated by arrow A4 illustrated in FIG. 15.

Then, similar to the above-described configuration, the biasing force F of the pair of springs 43 (i.e., a back torque) is transmitted from the first output gear 53 to the planetary gear mechanism 70 and the drive coupling member 71. Therefore, the drive coupling member 71 rotates faster than the rotation drive speed.

Figure 16B:
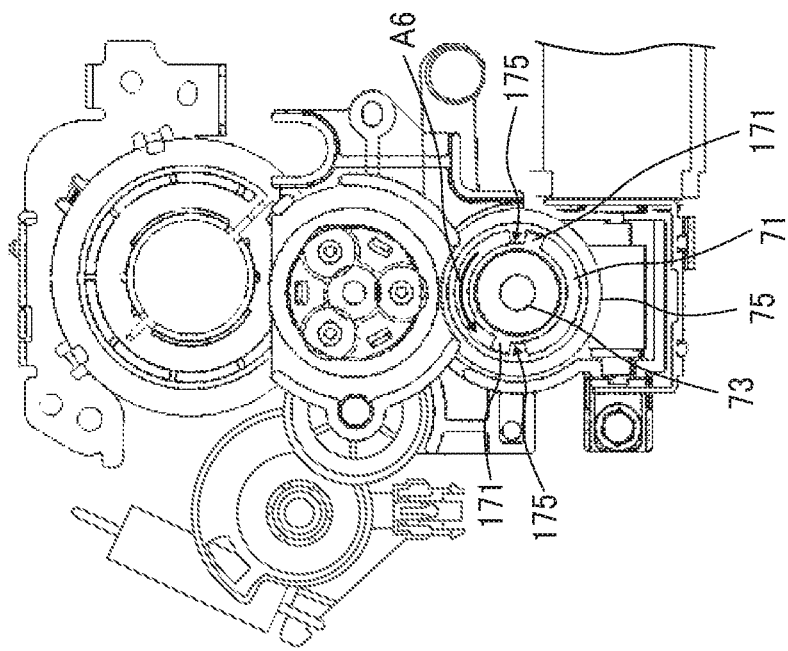
FIG. 16B is a diagram illustrating the drive coupling member having rotated faster than the rotation drive speed by a back torque.
Figure 16A:
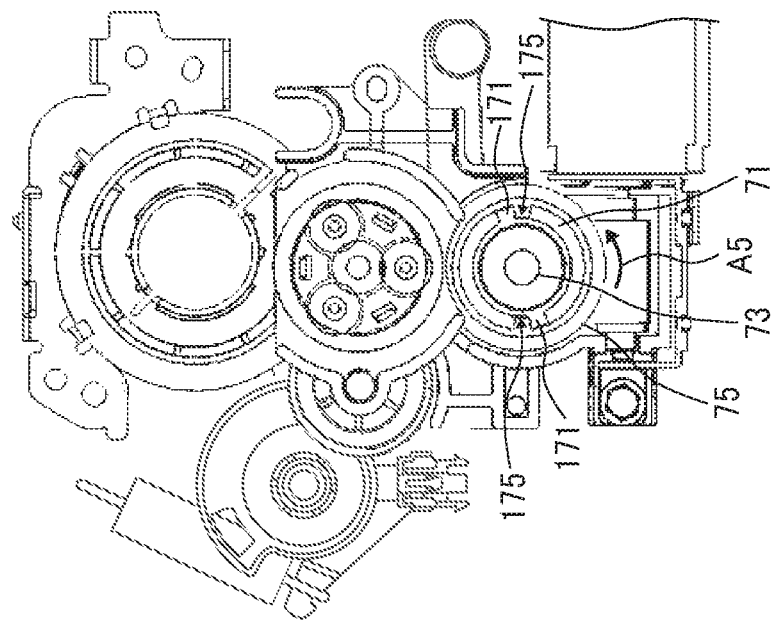
FIG. 16A is a diagram illustrating a drive coupling member before rotating faster than a rotation drive speed.

FIG. 16A is a diagram illustrating the drive coupling member 71 before rotating faster than the rotation drive speed. FIG. 16B is a diagram illustrating the drive coupling member 71 having rotated faster than the rotation drive speed by the back torque.

As indicated by arrow A5 illustrated in FIG. 16A, while the drive coupling member 71 is rotating at the rotation drive speed by receiving the driving force from the drive motor 51, the drive side engagement projection 175 contacts the driven side engagement projection 171 from the upstream side of the rotation direction, so as to transmit the driving force to the drive coupling member 71. Consequently, the worm wheel 75 and the drive coupling member 71 rotate as a single unit.

As indicated by arrow A6 illustrated in FIG. 16B, as the drive coupling member 71 rotates faster than the rotation drive speed due to the back torque, the driven side engagement projection 171 moves in the rotation direction to separate from the drive side engagement projection 175.

In the present embodiment, in order to make assembly of the fixing device 12 easy, the play of the drive coupling member 71 between the driven side engagement projection 171 and the drive side engagement projection 175 is set to substantially an angle of 180 degrees. Therefore, as the drive coupling member 71 increases the rotation speed by the back torque and after the driven side engagement projection 171 has been moved in the rotation direction by an angles of substantially 180 degrees, the driven side engagement projection 171 is likely to hit against the drive side engagement projection 175 with great force, resulting in generation of sound of collision.

For these reasons, the drive device 50 (the drive transmission device 90) further includes the torque limiter 72 that functions as a load applying body, so that a load is applied to rotation of the drive coupling member 71 by backlash.

Specifically, the back torque is transmitted to the drive coupling member 71, and as the drive coupling member 71 rotates faster than the rotation drive speed, the back torque is inputted to the torque limiter 72 via the drive coupling member 71. The torque to operate the torque limiter 72 is set smaller than the value of the above-described back torque. As the drive torque is inputted to the torque limiter 72, the torque limiter 72 is operated to interrupt the transmission of the driving force between the drive coupling member 71 and the drive shaft 73.

When the torque limiter 72 is operated and the drive transmission is interrupted, a predetermined rotational load is applied. For example, in a case in which the torque limiter 72 is a friction type limiter, when a torque that is applied to the torque limiter 72 is greater than a static friction force generated between a first member that is attached to the drive shaft 73 of the torque limiter 72 and a second member that is attached to the drive coupling member 71, the second member rotates relative to the first member so as to cut off the drive transmission. Accordingly, while the second member is rotating relative to the first member and the drive transmission is being blocked, a predetermined frictional force is generated between the first member and the second member, thereby generating a rotational load. By contrast, in a case in which the torque limiter 72 is a magnetic type limiter, while the second member is rotating relative to the first member and the drive transmission is being blocked, a predetermined magnetic force is generated between the first member and the second member, thereby generating a rotational load. As described above, when the torque limiter 72 is operated to block the drive transmission, a rotational load is generated. Therefore, when the back torque is transmitted to the drive coupling member 71, the drive coupling member 71 rotates faster than the rotation drive speed to operate the torque limiter 72. Then, the load is generated and applied to the torque limiter 72, so as to brake the rotation of the drive coupling member 71. Accordingly, after the rotation of the drive coupling member 71 is reduced sufficiently, the driven side engagement projection 171 collides with the drive side engagement projection 175, and therefore occurrence of a sound of collision can be restrained.

Further, when the pair of cams 44 is rotated by the driving force applied by the drive motor 51, no torque is applied to the torque limiter 72, and therefore the torque limiter 72 is not operated. The torque limiter 72 is operated to apply the rotational load when the pair of cams 44 is rotated by the biasing force applied by the pair of springs 43. Accordingly, the load that is applied when the pair of cams 44 is rotated by the driving force applied by the drive motor 51 can be reduced, and therefore the drive motor 51 can employ a motor that is less expensive and has a relatively small output torque.

Further, in the present embodiment, the rotational load can be applied when the pair of cams 44 is rotated relatively fast by applying the biasing force of the pair of springs 43, even without detecting the rotation speed of the pair of cams 44 using a detection sensor. Further, the present embodiment of this disclosure can apply a load with a simpler configuration in comparison with a configuration in which, when the pair of cams 44 is rotated faster than a regulated speed, a frictional resistance member is moved so as to press the frictional resistance member against the drive coupling member 71 to apply a load. Accordingly, the configuration according to the present embodiment can form the load applying device 80 with a less expensive configuration, and therefore can reduce the cost and size of the image forming apparatus 100. Further, by enclosing the torque limiter 72 by the drive side coupling 75a and the driven side coupling 71b, the configuration according to the present embodiment can restrain an increase in size of the load applying device 80.

Further, in the present embodiment, it is preferable that a spur gear is employed as each gear (i.e., the cam gear 55, the second output gear 54 and the first output gear 53) of the drive device 50 (the drive transmission device 90). In the present embodiment, when the non-press in state is changed to press in state, the drive motor 51 is driven and rotated in a direction opposite the rotational direction to change from the press in state to the non-press in state. Consequently, each gear (i.e., the cam gear 55, the second output gear 54 and the first output gear 53) of the drive device 50 (the drive transmission device 90) is rotated in a direction opposite the rotational direction to change from the non-press in state to the press in state. Therefore, in a case in which each gear of the drive device 50 (the drive transmission device 90) is a helical teeth gear, a force acting in a thrust direction (an axial direction) to change from the non-press in state to the press in state and a force acting in the thrust direction (the axial direction) to change from the press in state to the non-press in state direct opposite to each other. As a result, each gear of the drive device 50 (the drive transmission device 90) moves different thrust directions in a case of changing from the non-press in state to the press in state and in a case of changing from the press in state to the non-press in state. Consequently, it is likely that each gear collides a member opposed to the thrust direction, resulting in generation of sound of collision. As an example, when the second output gear 54 that is rotatably supported by the second support shaft 153 is changed from the non-press in state to the press in state, the second output gear 54 moves to the second housing 56 to collide with the second housing 56, thereby generating the sound of collision. Further, when the second output gear 54 is changed from the press in state to the non-press in state, the second output gear 54 moves to the bracket 52 to collide with the bracket 52, thereby generating the sound of collision.

By contrast, in a case in which each gear of the drive device 50 (the drive transmission device 90) employs a spur gear, the force of the gear does not act in the thrust direction, and therefore each gear is restrained from moving in the thrust direction. Consequently, each gear is restrained from colliding a member opposed to the thrust direction, and therefore generation of a sound of collision is restrained.

Figure 17:
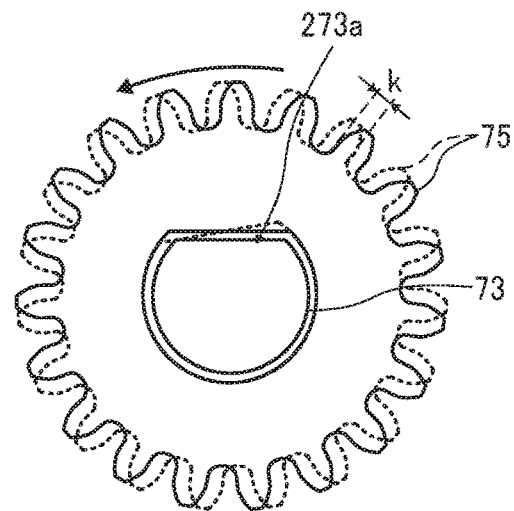
FIG. 17 is a diagram illustrating a case in which the worm wheel is attached to a D-shaped cut portion of the drive shaft with a non-press in manner.

FIG. 17 is a diagram illustrating a case in which the worm wheel 75 is attached to a D-shaped cut portion 273a of the drive shaft 73 with a non-press in manner.

As illustrated in FIG. 17, in a case in which the worm wheel 75 is attached to the D-shaped cut portion 273a of the drive shaft 73 with a non-press in manner, the worm wheel 75 rattles in the rotational direction by an amount "k" indicated in FIG. 17, relative to the drive shaft 73, as illustrated with a broken line in FIG. 17.

In the present embodiment, before the torque limiter 72 is operated to interrupt the drive transmission, the back torque is transmitted to the drive shaft 73 via the torque limiter 72. As a result, the worm wheel 75 rotates relatively fast by the back torque, and the teeth of a gear teeth portion 75b of the worm wheel 75 collide the worm 61. The worm 61 is a member mounted on the motor shaft to directly transmit the drive transmission force to the drive motor 51. Therefore, different from other drive transmission members, the back torque cannot be transmitted to the drive transmission member such as gears disposed on the upstream side of the drive transmitting direction. Therefore, as illustrated in FIG. 17, when the worm wheel 75 is mounted on the D-shaped cut portion 273a of the drive shaft 73 with the non-press in manner and is rattled in the rotational direction, after the teeth of the gear teeth portion 75b of the worm wheel 75 have collided to the worm 61, and the worm wheel 75 vibrates in the rotational direction. As a result, the teeth of the gear teeth portion 75b of the worm wheel 75 hits against the worm 61 again and again, the noise has been generated.

In order to address this inconvenience, in the present embodiment, the worm wheel 75 is attached to the drive shaft 73 in a press in manner. According to this operation, the worm wheel 75 is restrained from rattling in the rotational direction to the drive shaft 73. As a result, the worm wheel 75 rotates faster than the rotation drive speed by the back torque. Therefore, after the worm wheel 75 has collided to the worm 61, the worm wheel 75 is prevented from vibrating in the rotational direction, and is prevented or restrained from generating noise.

However, in a case of a configuration in which the worm wheel 75 is attached to the drive shaft 73 in the press in manner, the assembly of the worm wheel 75 to the drive shaft 73 becomes difficult.

In order to avoid this inconvenience, in the present embodiment, press-in portion 73a to which the worm wheel 75 is pressed includes two planes having different distances from the axial center and one sloped face that connects the two planes.

A description is given of the detailed configurations of the worm wheel 75 and the press-in portion 73a of the drive shaft 73 with reference to the drawings.

Figure 18:
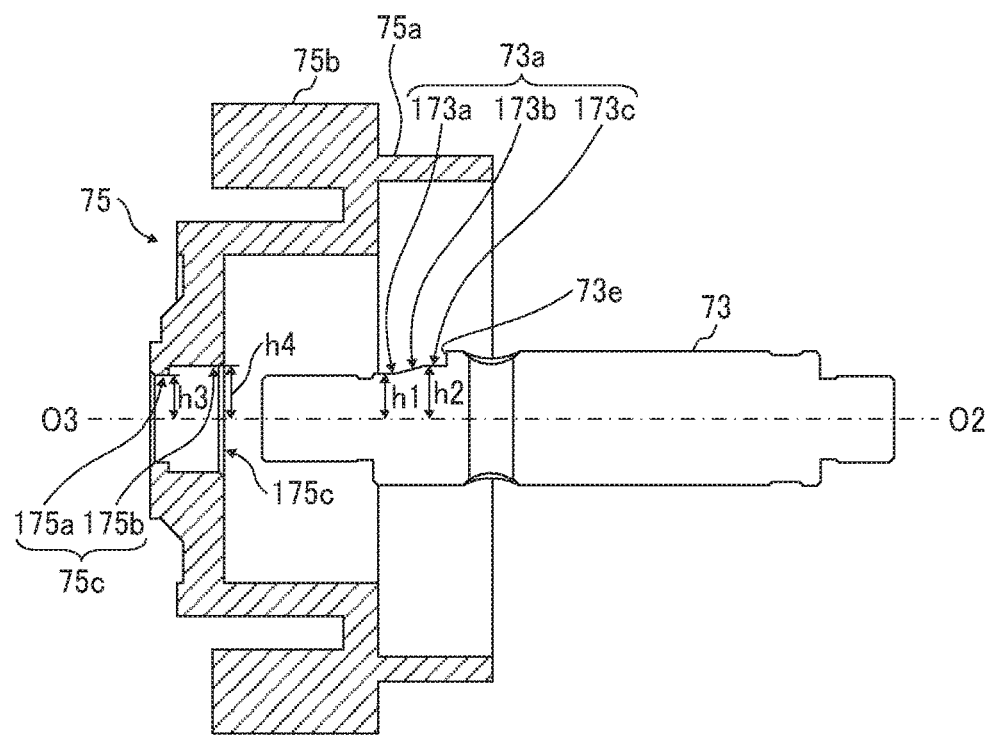
FIG. 18 is a cross sectional view illustrating a drive shaft and a worm wheel.

FIG. 18 is a cross sectional view illustrating the drive shaft 73 and the worm wheel 75.

As illustrated in FIG. 18, the press-in portion 73a to which the worm wheel 75 is pressed is provided to one end of the drive shaft 73 (i.e., the left end in FIG. 18). The press-in portion 73a includes a first plane 173a, a second plane 173c and a sloped face 173b. The first plane 173a is parallel to the axial direction of the drive shaft 73. The second plane 173c is parallel to the axial direction of the drive shaft 73 and has a distance from an axial center O2 of the drive shaft 73 ("h2" in FIG. 18) longer (greater) than a distance from the axial center O2 to the first plane 173a ("h1" in FIG. 18) (h1<h2). The second plane 173c is disposed close to the axis of the drive shaft 73 than the first plane 173a is to the axis of the drive shaft 73. The sloped face 173b connects the first plane 173a and the second plane 173c and is angled relative to the axial direction of the drive shaft 73.

The press-in hole 75c of the worm wheel 75, into which the drive shaft 73 is pressed, has an inner circumferential surface. A first inner circumferential plane 175a and a second inner circumferential plane 175b are provided on the inner circumferential surface of the press-in hole 75c. The first inner circumferential plane 175a, to which the first plane 173a is pressed, is parallel to the axial direction of the drive shaft 73 to be pressed to the worm wheel 75. The second inner circumferential plane 175b, to which the second plane 173c is pressed, is parallel to the axial direction of the drive shaft 73. The second inner circumferential plane 175b has a distance from an axial center O3 of the worm wheel 75 ("h4" in FIG. 18) longer (greater) than a distance from the axial center O3 to the worm wheel 75 ("h3" in FIG. 18) (h3<h4). The second inner circumferential plane 175b is disposed downstream from the first inner circumferential plane 175a in the inserting direction to the drive shaft 73. Further, the worm wheel 75 further includes a taper 175c that is disposed at a downstream end of the drive shaft 73 in the inserting direction to the drive shaft 73. An inner diameter of the taper 175c increases as the taper 175c extends toward a downstream end of the inserting direction to the drive shaft 73.

FIGS. 19A1, 19A2, 19A3, 19B1, 19B2 and 19B3 are diagrams illustrating respective steps when the worm wheel 75 is pressed into the drive shaft 73.

FIGS. 19A1, 19A2 and 19A3 are diagrams illustrating the steps of press-in of the worm wheel 75 according to the present embodiment. FIGS. 19B1, 19B2 and 19B3 are diagrams illustrating the steps of press-in of a comparative worm wheel 75'.

In the comparative configuration illustrated in FIGS. 19B1, 19B2 and 19B3, a press-in portion 73a' of a comparative drive shaft 73' is provided with a single plane 173' and a press-in hole 75c' of the comparative worm wheel 75' is provided with a single inner circumferential plane 175'.

As illustrated in FIGS. 19B1 and 19B2, in the comparative configuration, in a state in which the axial center O2 of the comparative drive shaft 73' and the axial center O3 of the comparative worm wheel 75', as the comparative worm wheel 75' is inserted into the comparative drive shaft 73', the downstream side end of the press-in hole 75c' in the inserting direction contacts the end of the press-in portion 73a'. Therefore, in this case, the comparative worm wheel 75' is moved to the comparative plane 173' (i.e., an upward direction in FIGS. 19B1 and 19B2), so as to match the axial center O2 of the comparative drive shaft 73' and the axial center O3 of the comparative worm wheel 75'. However, in a case in which the comparative worm wheel 75' is moved to the upward direction in FIGS. 19B1 and 19B2 too much, the end portion of a circular arc surface on the opposite side of the inner circumferential plane 175' of the press-in hole 75c' contacts the end portion of the press-in portion 73a'. As described above, in the comparative configuration, it is not easy to match the axial center O2 of the comparative drive shaft 73' and the axial center O3 of the comparative worm wheel 75' when the press-in hole 75c' is pressed in the press-in portion 73a', and therefore it is not easy to perform a press in operation of the comparative worm wheel 75' to the comparative drive shaft 73'.

Further, as the downstream side end of the press-in hole 75c' in the inserting direction contacts the end portion of the press-in portion 73a', the insertion resistance of the comparative worm wheel 75' increases. However, it is difficult to determine whether the increase of the insertion resistance is caused by the insertion resistance generated when the press-in hole 75c' is pressed in the press-in portion 73a' or by the insertion resistance generated when the downstream side end of the press-in hole 75c' in the inserting direction contacts the end portion of the press-in portion 73a'. Therefore, the press-in hole 75c' is pressed to the press-in portion 73a' with a certain amount of force. That is, when the comparative worm wheel 75' does not move in the axial direction even though the press-in hole 75c' is pressed to the press-in portion 73a' with the certain amount of force, it is known that the downstream side end of the press-in hole 75c' in the inserting direction is in contact with the end portion of the press-in portion 73a'.

As described above, in the present embodiment, as illustrated in FIGS. 19A1 and 19A2, in a state in which the axial center O2 of the drive shaft 73 and the axial center O3 of the worm wheel 75, as the worm wheel 75 is inserted into the drive shaft 73, the downstream side end of the press-in hole 75c in the inserting direction contacts the sloped face 173b. Therefore, in the state in which the downstream side end of the press-in hole 75c in the inserting direction contacts the sloped face 173b, the worm wheel 75 is moved to a direction indicated by arrow S2 illustrated in FIG. 19A2 while being guided by the sloped face 173b. By so doing, the axial center O2 of the drive shaft 73 and the axial center O3 of the worm wheel 75 match with each other. Then, the press-in hole 75c is pressed to the press-in portion 73a in the state in which the axial center O2 of the drive shaft 73 and the axial center O3 of the worm wheel 75 match with each other.

As described above, in the present embodiment, as the worm wheel 75 is inserted into the drive shaft 73, the axial center O2 of the drive shaft 73 and the axial center O3 of the worm wheel 75 are matched automatically. Therefore, when compared with the comparative configuration as illustrated in FIGS. 19B1, 19B2 and 19B3, in which the axial center O2 of the comparative drive shaft 73' and the axial center O3 of the comparative worm wheel 75' are matched manually, the worm wheel 75 can be pressed to the drive shaft 73 more easily. Accordingly, easy attachment of the comparative worm wheel 75' to the comparative drive shaft 73' can be achieved.

Further, as illustrated in FIG. 19B3, in the comparative configuration, the distance of movement of the comparative worm wheel 75' while being pressed (hereinafter, referred to as a "press-in moving distance") is equal to an axial length K2 of the comparative press-in portion 73a' in the axial direction. By contrast, in the present embodiment, a press-in moving distance corresponds to an axial length K1 of the first plane 173a and an axial length K1 of the second plane 173c, which are shorter (smaller) than the axial length K2 of the press-in portion 73a. Therefore, the press-in moving distance in the configuration of the present embodiment can be shorter than a press-in moving distance in the comparative configuration. Since the press-in portion 73a according to the present embodiment is provided with the multiple planes having different distances from the axial center O2 of the drive shaft 73 and press-in hole 75c according to the present embodiment is provided with the multiple inner circumferential planes having different distances from the axial center O3 of the worm wheel 75 to be pressed to the multiple planes of the press-in portion 73a, the multiple inner circumferential planes of the worm wheel 75 are pressed to the corresponding multiple planes of the drive shaft 73 simultaneously. As described above, since the press-in moving distance can be reduced, the time the worm wheel 75 is pressed with great force can be also reduced, and therefore the worm wheel 75 can be pressed to the drive shaft 73 more easily.

Further, in the present embodiment, the portion of the worm wheel 75 to be pressed into the drive shaft 73 has two portions, which are a portion having the first inner circumferential plane 175a in the axial direction and a portion having the second inner circumferential plane 175b in the axial direction. Accordingly, the portion to be pressed to the drive shaft 73 according to the present embodiment is smaller than the comparative configuration in which the entire inner circumferential plane of the press-in hole 75c' is pressed to the drive shaft 73'. However, in the present embodiment, both axial ends of press-in hole 75c are pressed in. Therefore, even if a portion of the worm wheel 75 to be pressed is smaller, the worm wheel 75 can be pressed in and fixed to the drive shaft 73 without tilting. Accordingly, the worm wheel 75 can be meshed with the worm wheel 75 preferably.

Further, in the present embodiment, the taper 175c having the inner diameter increasing toward the end portion thereof is provided to the downstream side end of the inserting direction of press-in hole 75c to the drive shaft 73. According to this configuration, when the press-in hole 75c is inserted to the support 73b of the drive shaft 73, the taper 175c guides the support 73b of the drive shaft 73 to the press-in hole 75c. Accordingly, the press-in hole 75c can be easily inserted to the support 73b of the drive shaft 73.

Figure 20A:
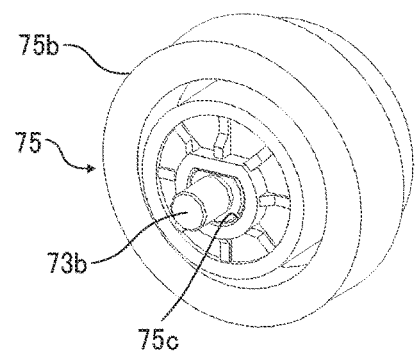
FIGS. 20A and 20B are perspective views illustrating the worm wheel pressed into the drive shaft.
Figure 20B:
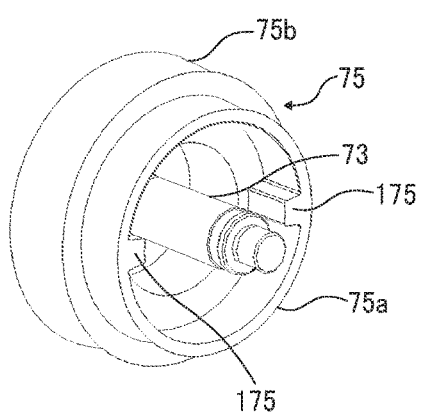
Figure 21A:
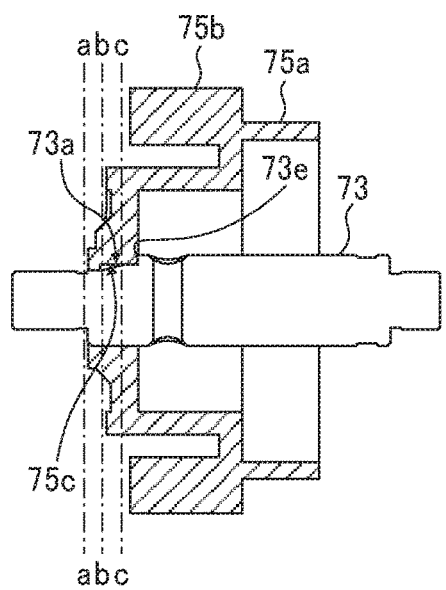
FIG. 21A is a lateral cross sectional view illustrating the worm wheel pressed into the drive shaft.
Figure 21B:
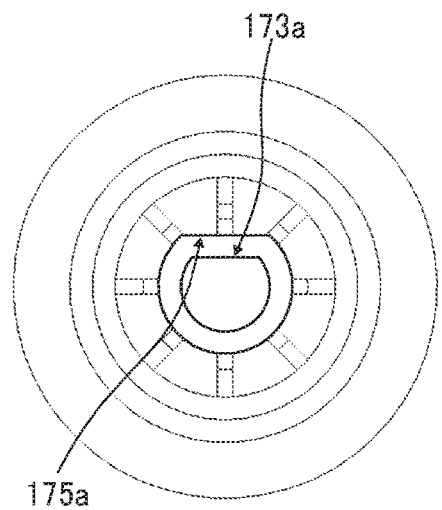
FIG. 21B is a cross sectional view of the worm wheel pressed into the drive shaft, along a line a-a of FIG. 21A.
Figure 21C:
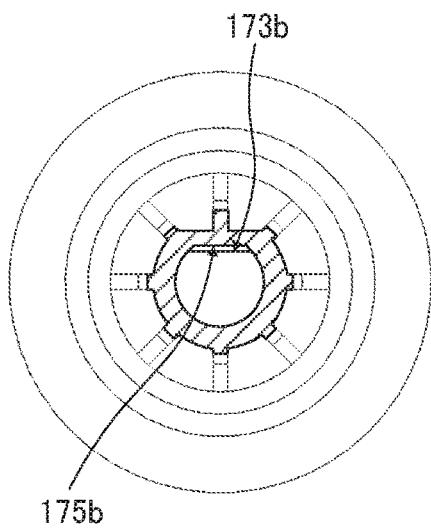
FIG. 21C is a cross sectional view of the worm wheel pressed into the drive shaft, along a line b-b of FIG. 21A.
Figure 21D:
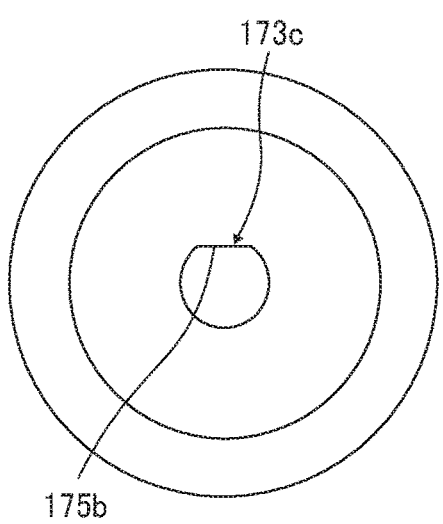
FIG. 21D is a cross sectional view of the worm wheel pressed into the drive shaft, along a line c-c of FIG. 21A.

Further, FIGS. 20A and 20B are perspective views illustrating the worm wheel 75 pressed into the drive shaft 73. Specifically, FIG. 20A is a perspective view illustrating the worm wheel 75, viewed from a side from which the drive shaft 73 is pressed therein and FIG. 20B is a perspective view illustrating the worm wheel 75, viewed from an opposite side of the worm wheel 75 of FIG. 20A. FIG. 21A is a lateral cross sectional view illustrating the worm wheel 75 pressed into the drive shaft 73. FIG. 21B is a cross sectional view of the worm wheel 75 pressed into the drive shaft 73, along a line a-a of FIG. 21A. FIG. 21C is a cross sectional view of the worm wheel 75 pressed into the drive shaft 73, along a line b-b of FIG. 21A. FIG. 21D is a cross sectional view of the worm wheel 75 pressed into the drive shaft 73, along a line c-c of FIG. 21A.

There are cases in which the axial length of the second plane 173c and the axial length of the sloped face 173b are shifted from a specified length, due to manufacturing errors. There may be a configuration in which a different sloped face is provided between the first inner circumferential plane 175a and the second inner circumferential plane 175b of the press-in hole 75c of the worm wheel 75 so as to contact the sloped face 173b of the press-in portion 73a, so that the entire inner circumferential plane of the press-in hole 75c contacts the press-in portion 73a. However, even if such manufacturing errors are made to this configuration, the worm wheel 75 cannot be pressed in to the press-in portion 73a entirely. As an example, in a case in which the second plane 173c is longer (greater) than a specified length, the different sloped face makes surface contact to the sloped face 173b before the worm wheel 75 is entirely pressed in to the press-in portion 73a. As a result, the worm wheel 75 cannot be pressed in further. If the worm wheel 75 cannot be entirely pressed in to the press-in portion 73a, the worm wheel 75 cannot be abutted against a step 73e that stands up in a normal direction from a downstream side end of the press-in portion 73a in the press-in direction of the worm wheel 75, as illustrated in FIG. 21A. As a result, the worm wheel 75 cannot be positioned at the specified position in the axial direction, and therefore it is not likely that the worm wheel 75 is meshed with the worm 61 preferably.

By contrast, in the present embodiment, as illustrated in FIG. 21C, in a state in which the worm wheel 75 is pressed in the drive shaft 73, the worm wheel 75 has a gap with the sloped face 173b of press-in portion 73a, and therefore the worm wheel 75 is not in contact with the sloped face 173b. Therefore, even when the axial lengths of the first plane 173a, the second plane 173c and the sloped face 173b are shifted relative to the specified lengths due to manufacturing errors, the worm wheel 75 can be pressed in to the press-in portion 73a entirely. To be more specific with a detailed example, as described above, in a case in which the second plane 173c is longer (greater) than the specified length, the downstream side thereof in the press-in direction of the first inner circumferential plane 175a is elastically deformed to bite (be pressed into) the sloped face 173b, so that the worm wheel 75 can be pressed in to the press-in portion 73a entirely. It is to be noted that, in order to smoothly press the downstream end side of the first inner circumferential plane 175a in the press-in direction of the first inner circumferential plane 175a to the sloped face 173b, the angle of angle of inclination of the sloped face 173b is likely to be relatively smaller.

As described above, the press-in hole 75c is formed to provide a gap between the worm wheel 75 and the sloped face 173b of the press-in portion 73a of the drive shaft 73 in the state in which the worm wheel 75 is pressed in the drive shaft 73. According to this configuration, even if there is a manufacturing error (or manufacturing errors), the worm wheel 75 is brought to contact the step 73e, and therefore the worm wheel 75 can be positioned at the specified position in the axial direction. As a result, the worm wheel 75 can be meshed with the worm 61 preferably.

Figure 22A:
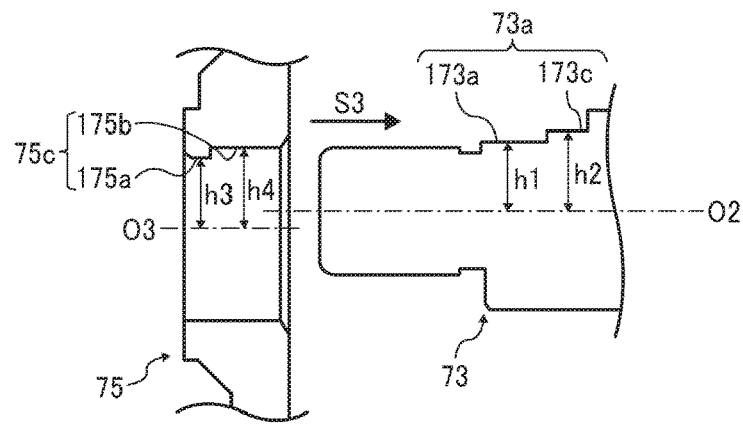
FIGS. 22A, 22B and 22C are diagrams illustrating an example in which a press-in portion without a sloped face.
Figure 22B:
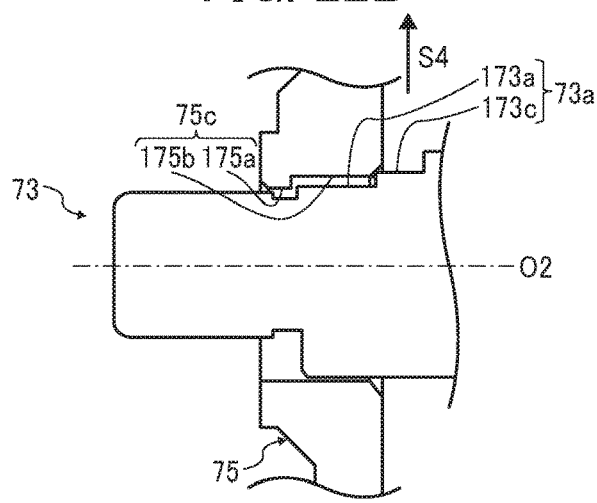
Figure 22C:
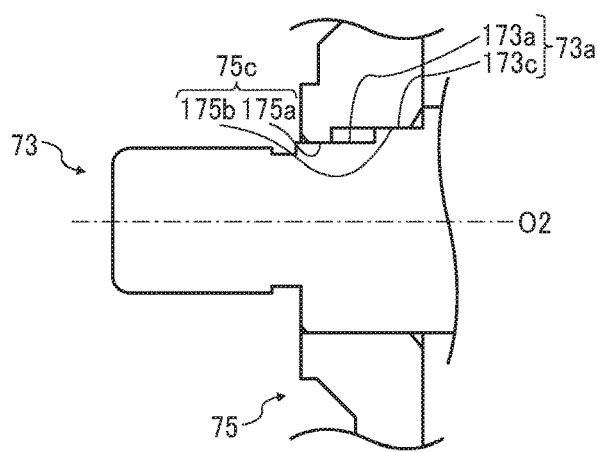

FIGS. 22A, 22B and 22C are diagrams illustrating an example in which the press-in portion 73a without the sloped face 173b.

As illustrated in FIGS. 22A and 22B, in the state in which the axial center O3 of the worm wheel 75 is shifted from the axial center O2 of the drive shaft 73, as the worm wheel 75 is inserted into the drive shaft 73, the downstream side end of the worm wheel 75 in the inserting direction of the worm wheel 75 abuts against the upstream side end of the second plane 173c in the inserting direction of the second plane 173c. However, at this time, a part of the press-in hole 75c of the worm wheel 75 is inserted in the press-in portion 73a. Therefore, by moving the worm wheel 75 in a direction indicated by arrow S4 illustrated in FIG. 22B (i.e., the upward direction in FIG. 22B) and contacting the arc-shaped inner circumferential surface of the press-in hole 75c to the outer circumferential surface of the press-in portion 73a, the axial center O3 of the worm wheel 75 and the axial center O2 of the drive shaft 73 can be matched. Then, as the worm wheel 75 is moved in the axial direction, the worm wheel 75 is pressed in to the press-in portion 73a in the state in which the axial center O3 of the worm wheel 75 and the axial center O2 of the drive shaft 73 are matched. Accordingly, the worm wheel 75 can be easily attached to the drive shaft 73.

Next, a description is given of a drive transmission device to transmit a driving force of a sheet output motor to the pair of sheet output rollers 20.

Figure 23:
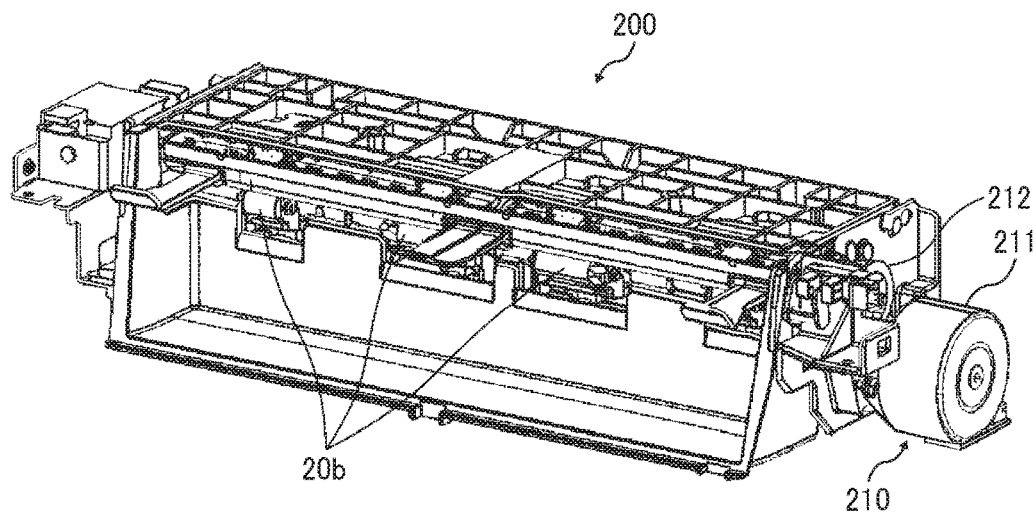
FIG. 23 is a perspective view illustrating a sheet discharging unit.
Figure 24:
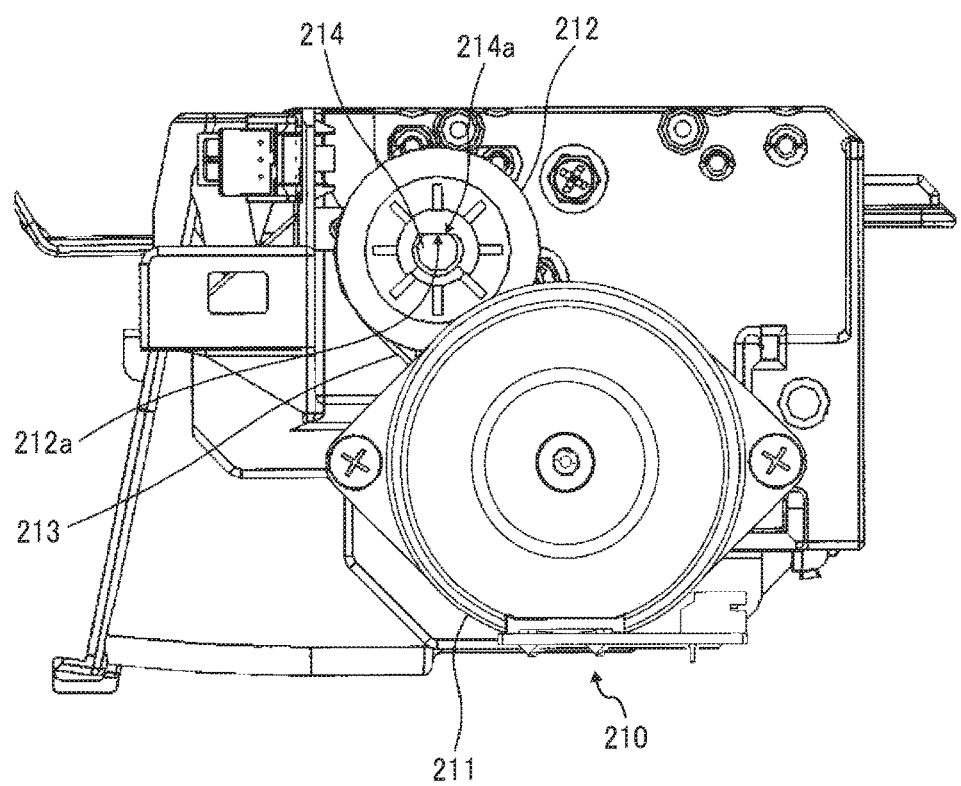
FIG. 24 is a side view illustrating the sheet discharging unit.
Figure 25:
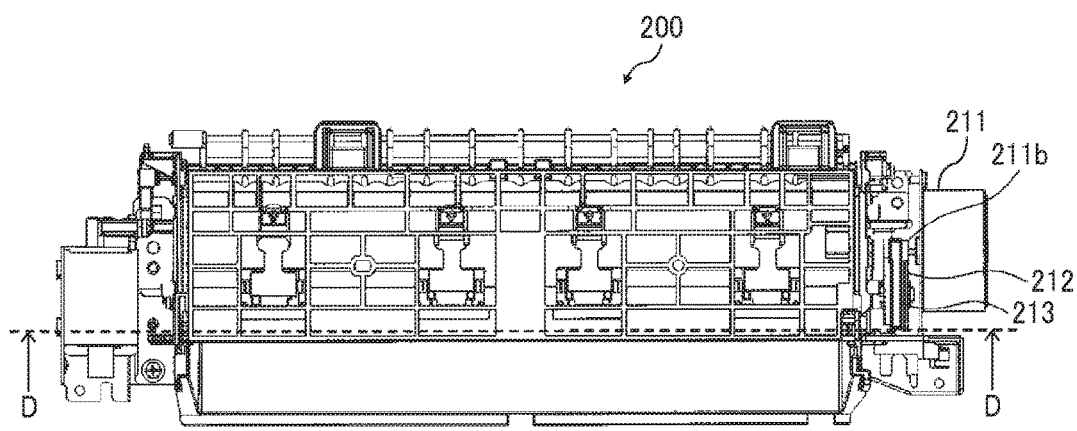
FIG. 25 is a plan view illustrating the sheet discharging unit.
Figure 26:
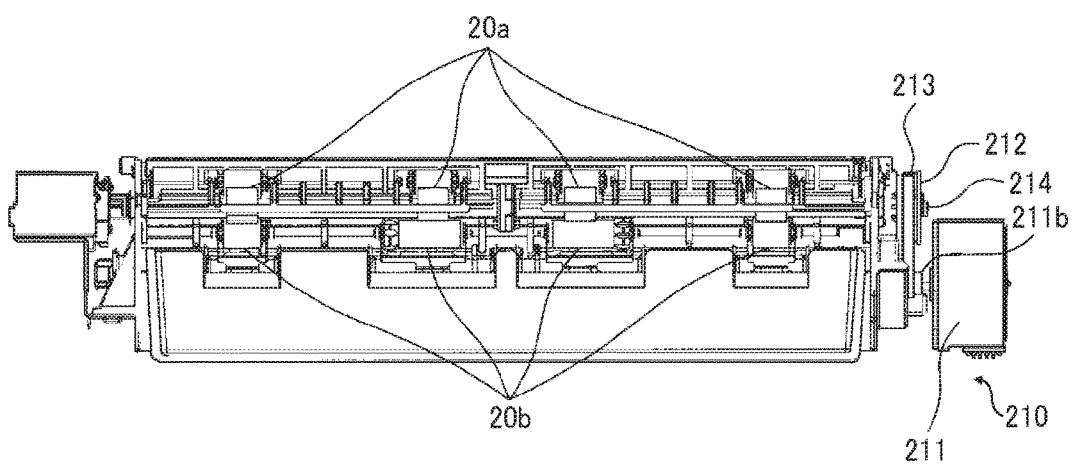
FIG. 26 is a cross sectional view illustrating the sheet discharging unit of FIG. 25, along a D-D of FIG. 25.

FIG. 23 is a perspective view illustrating the front view illustrating a sheet discharging device 200. FIG. 24 is a front view illustrating the sheet discharging device 200. FIG. 25 is a plan view illustrating the sheet discharging device 200. FIG. 26 is a cross sectional view illustrating the sheet discharging unit of FIG. 25, along a D-D of FIG. 25.

The sheet discharging device 200 includes the pair of sheet output rollers 20 that includes a drive side sheet output roller 20a and a driven side sheet discharging roller 20b. The driven side sheet discharging roller 20b contacts the drive side sheet output roller 20a to be rotated along with the drive side sheet output roller 20a. Four sets of the drive side sheet output rollers 20a and the driven side sheet discharging rollers 20b (i.e., four pairs of sheet output rollers 20) are aligned in the rotational axis direction at predetermined intervals. Further, a sheet output drive device 210 is provided on a side face of one the sheet discharging device 200, so as to drive and rotate the drive side sheet output rollers 20a.

Figure 27:
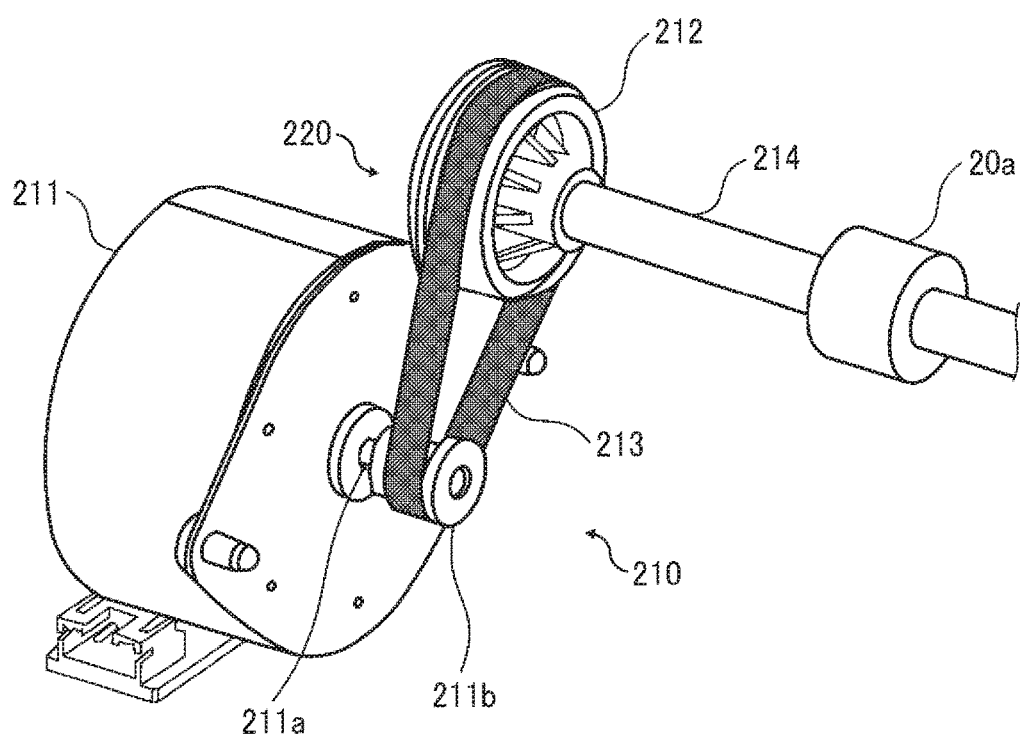
FIG. 27 is a perspective view illustrating a sheet discharging drive device.

FIG. 27 is a perspective view illustrating the sheet output drive device 210.

The sheet output drive device 210 includes a sheet output motor 211 and a belt drive transmission mechanism 220. The belt drive transmission mechanism 220 includes a drive pulley 211b, a driven pulley 212 and a timing belt 213. The drive pulley 211b is mounted on a motor shaft 211a of the sheet output motor 211. The driven pulley 212 is mounted on a sheet output shaft 214 of the drive side sheet output roller 20a. The timing belt 213 is stretched by the drive pulley 211b and the driven pulley 212.

As illustrated in FIG. 24, the driven pulley 212 includes a substantially elastically deformable material such as resin and has a press-in hole 212a having a substantially D-shaped cross section to be pressed into a press-in portion 214a having a substantially D-shaped cross section on the sheet output shaft 214 at an end on the side close to the sheet output drive device 210.

In a case in which the driven pulley 212 is attached to a D-shaped portion of the sheet output shaft 214 in a non-press in manner, when a tension force of the timing belt 213 is greater than a reaction force from the D-shaped face of the sheet output shaft 214 (hereinafter, referred to as a "shaft D-shaped face reaction force (of the sheet output shaft 214)"), a noise is generated.

A description is given of this occurrence of noise with reference to the drawings.

Figure 28A:
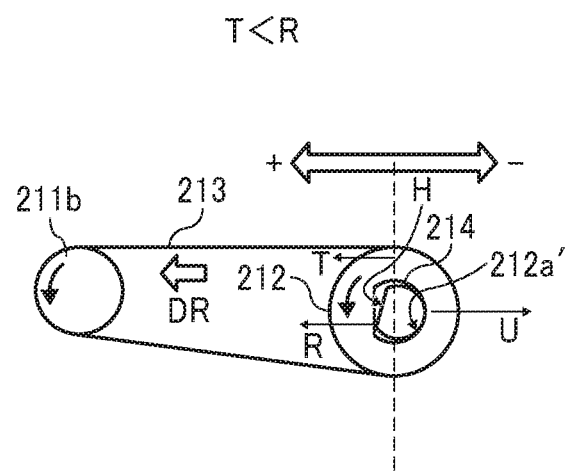
FIGS. 28A, 28B, 28C, 28D and 28E are diagrams illustrating occurrence of abnormal sound (noise) when a driven pulley is attached to the D-shaped portion with a non-press in manner.
Figure 28B:
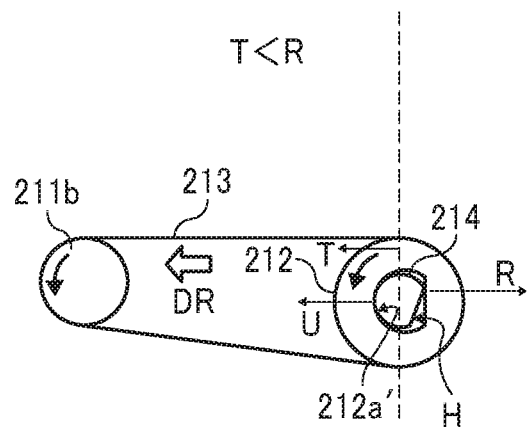
Figure 28C:
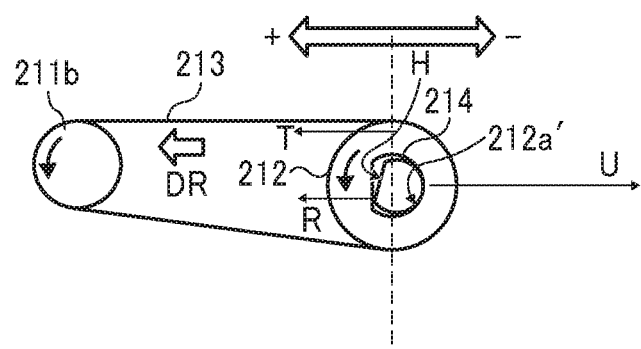
Figure 28D:
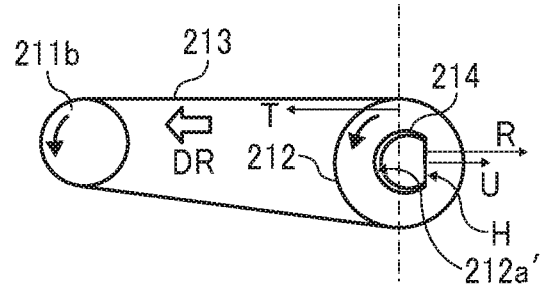
Figure 28E:
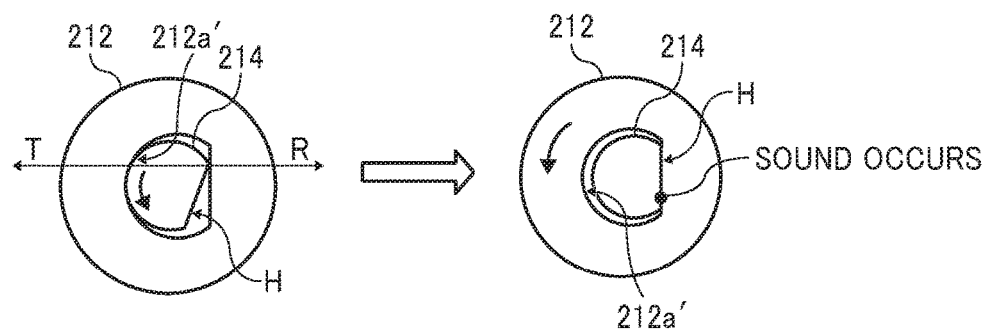

FIGS. 28A, 28B, 28C, 28D and 28E are diagrams illustrating occurrence of abnormal sound (noise) when the driven pulley 212 is attached to the D-shaped portion of the sheet output shaft 214 with a non-press in manner. FIGS. 28A and 28B are diagrams illustrating a case in which a tension force T of the timing belt 213 is smaller than a shaft D-shaped face reaction force R of the sheet output shaft 214. FIGS. 28C, 28D and 28E are diagrams illustrating a case in which the tension force T of the timing belt 213 is greater than the shaft D-shaped face reaction force R of the sheet output shaft 214.

It is to be noted that the "tension force T of the timing belt 213" includes a "tension force T1 transmitted from the timing belt 213" and a "tension force T2 for attaching the timing belt 213 (a tension force (or a belt tension) on the timing belt 213 in a rest state in which the timing belt 213 is wound around the drive pulley 211b and the driven pulley 212 while the drive pulley 211b is not rotating)". (T≈T1+T2)

Further, in the following description, the term "plus (+) side" represents a side close to the drive pulley 211b from the center of rotation of the sheet output shaft 214 and the term "minus (−) side" represents an opposite side to the drive pulley 211b from the center of rotation of the sheet output shaft 214.

Examples of forces applied on the driven pulley 212 are the tension force T of the timing belt 213, the shaft D-shaped face reaction force R and a reaction force U from the sheet output shaft 214.

As illustrated in FIGS. 28A and 28C, in a case in which a flat surface H of the D-shaped portion of the sheet output shaft 214 is located on the side close to the drive pulley 211b (i.e., the plus side), a direction of the tension force T of the timing belt 213 and a direction of the shaft D-shaped face reaction force R are identical to each other, which is the plus side. Therefore, at this time, the driven pulley 212 moves in the direction toward the drive pulley 211b by the tension force T of the timing belt 213, so that an inner circumferential surface of an attaching hole (a press-in hole) 212a' contacts a curved surface of the D-shaped portion of the sheet output shaft 214.

Further, since the inner circumferential surface of the attaching hole 212a' of the driven pulley 212 contacts the curved surface of the D-shaped portion of the sheet output shaft 214, a predetermined gap is provided between the inner circumferential surface of the attaching hole 212a' and the flat surface H of the D-shaped portion of the sheet output shaft 214. As the driven pulley 212 receives the rotation driving force from the timing belt 213 to rotate, the inner circumferential surface of the attaching hole 212a' of the driven pulley 212 contacts the downstream side end of the flat surface H of the D-shaped portion of the sheet output shaft 214. Accordingly, the driving force is transmitted from the driven pulley 212 to the sheet output shaft 214, thereby rotating the sheet output shaft 214.

Further, since the inner circumferential surface of the attaching hole 212a' of the driven pulley 212 contacts the curved surface of the D-shaped portion of the sheet output shaft 214, the driven pulley 212 receives the reaction force U from the sheet output shaft 214 in the minus (−) direction. The reaction force U is a sum of the tension force T of the timing belt 213 and the shaft D-shaped face reaction force R.

In a case in which the tension force T of the timing belt 213 is smaller than the shaft D-shaped face reaction force R, when the sheet output shaft 214 is rotated in a direction of rotation DR by an angle of 180 degrees from the state of FIG. 28A, similar to FIG. 28A, the state in which the inner circumferential surface of the attaching hole 212a' of the driven pulley 212 is in contact with the curved surface of the D-shaped portion of the sheet output shaft 214 is maintained. Consequently, the driven pulley 212 receives the reaction force U from the curved surface of the shaft D-shaped portion (see FIG. 28B).

By contrast, in a case in which the tension force T of the timing belt 213 is greater than the shaft D-shaped face reaction force R, as illustrated in FIG. 28D, when the sheet output shaft 214 is rotated in the direction of rotation DR by an angle of 180 degrees from the state of FIG. 28C, the flat surface H of the of the sheet output shaft 214 remains in contact with the inner circumferential surface of the attaching hole 212a' is maintained. Consequently, the driven pulley 212 receives the reaction force U from the flat surface H of the shaft D-shaped portion. As described above, when the tension force T of the timing belt 213 is greater than the shaft D-shaped face reaction force R, the sheet output shaft 214 relatively moves in the attaching hole 212a' of the driven pulley 212 during one rotation. Due to this action, abnormal sound (noise) is generated for one time per rotation of the sheet output shaft 214.

FIG. 28E is a diagram illustrating a mechanism in which the flat surface H of the sheet output shaft 214 contacts the inner circumferential surface of the attaching hole 212a' of the driven pulley 212 when the sheet output shaft 214 is rotated by the angle of 180 degrees from the state in FIG. 28C.

As illustrated in FIG. 28E, when the sheet output shaft 214 is rotated by the angle of 180 degrees from the state of FIG. 28C and the flat surface H of the D-shaped portion comes to the minus (−) side, the direction of the shaft D-shaped face reaction force R and the direction of the tension force T of the timing belt 213 become different from each other. At this time, the tension force T is added to the downstream side end of the flat surface H of the sheet output shaft 214 via the driven pulley 212, so that the tension force T acts to rotate the sheet output shaft 214.

In a case in which the shaft D-shaped face reaction force R is greater than the tension force T, the sheet output shaft 214 is not rotated by the tension force T. Therefore, as illustrated in FIG. 28B, the state in which the inner circumferential surface of the attaching hole 212a' of the sheet output shaft 214 is in contact with the curved surface of the D-shaped portion of the sheet output shaft 214 is maintained.

By contrast, in a case in which the tension force T of the timing belt 213 is greater than the shaft D-shaped face reaction force R, the sheet output shaft 214 is rotated by the tension force T. Then, as illustrated in FIG. 28D, the contact portion of the sheet output shaft 214 to contact with the inner circumferential surface of the attaching hole 212a' of the driven pulley 212 changes from the circumferential surface to the flat surface H. Further, the sheet output shaft 214 is rotated by the tension force T, and the upstream side end (i.e., the lower end of the flat surface H in FIG. 28E) of the flat surface H in the rotational direction that is separated from the attaching hole (press-in hole) 212a contacts the inner circumferential surface of the attaching hole 212a. At this time, abnormal sound (noise) occurs.

In order to restrain such occurrence of abnormal sound, it is designed to reduce the tension force T of the timing belt 213 to be smaller than the shaft D-shaped face reaction force R. However, in a case in which a center distance of the drive pulley and the driven pulley becomes longer (greater) than the shaft D-shaped face reaction force R due to variation in parts and assembly, the tension force T of the timing belt 213 becomes greater than the shaft D-shaped face reaction force R, therefore it was likely to generate abnormal sound (noise).

In order to restrain occurrence of abnormal sound (noise), grease may be applied to the gap between the D-shaped portion of the sheet output shaft 214 and the attaching hole 212a' of the driven pulley 212. By applying grease to the gap between the D-shaped portion of the sheet output shaft 214 and the attaching hole 212a' of the driven pulley 212, the grease acts as resistance when the sheet output shaft 214 is rotated by the tension force T relative to the driven pulley 212. Accordingly, it is prevented that the upstream side end in the rotational direction of the flat surface H contacts the inner circumferential surface of the attaching hole 212a' with great force, and therefore occurrence of abnormal sound is restrained. In this case, however, a seal to block the grease is provided, resulting in an increase in costs of the device. Further, an additional step to fill grease is provided, thereby increasing the number of assembly steps.

Therefore, in the belt drive transmission mechanism 220, it is preferable that the driven pulley 212 is attached to the sheet output shaft 214 in a press in manner. Accordingly, even when the tension force T of the timing belt 213 is greater than the shaft D-shaped face reaction force R, the sheet output shaft 214 is prevented from relatively moving in the attaching hole 212a' of the driven pulley 212, and therefore the occurrence of abnormal sound is prevented. Further, the driven pulley 212 and the sheet output shaft 214 are assembled by pressing the driven pulley 212 in the sheet output shaft 214. Therefore, when compared with a configuration in which grease is filled in the gap, an increase in costs of the device and an increase in the number of assembly steps are restrained.

However, in a case of a configuration in which the entire inner circumferential surface of the press-in hole of the driven pulley 212 is pressed in to the sheet output shaft 214, the assembly of the driven pulley 212 to the sheet output shaft 214 becomes difficult. Therefore, in the belt drive transmission mechanism 220, similar to the configuration in which the worm wheel is pressed in to the drive shaft, the press-in portion of the driven pulley 212 to which the sheet output shaft 214 is pressed in includes two planes having different distances from the axial center and one sloped face that connects the two planes.

Figure 29A:
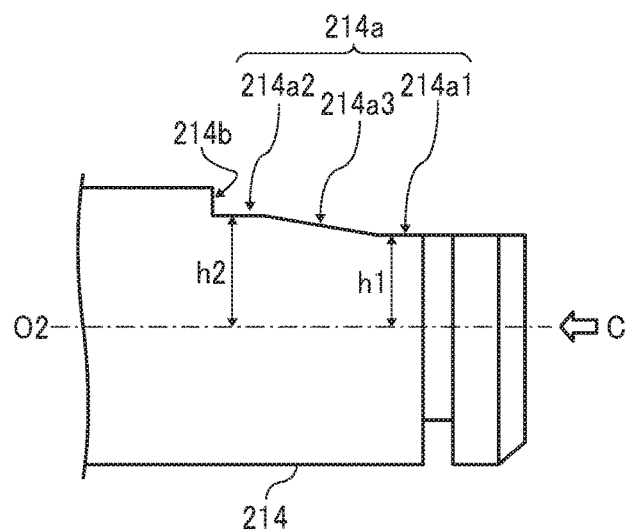
FIGS. 29A and 29B are enlarged views illustrating a sheet output shaft near the press-in portion.
Figure 29B:
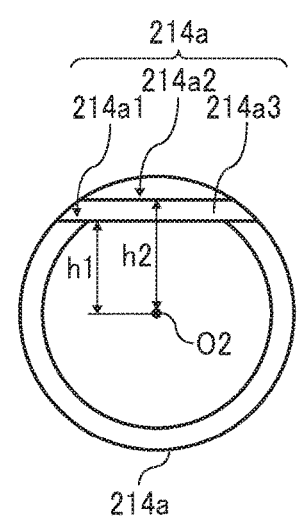

FIGS. 29A and 29B are enlarged views illustrating the sheet output shaft 214 near the press-in portion 214a. Specifically, FIG. 29A is an enlarged view illustrating the sheet output shaft 214, viewed from a direction perpendicular to the axial direction of the sheet output shaft 214. FIG. 29B is an enlarged view illustrating the sheet output shaft 214, viewed from the axial direction (i.e., a direction indicated by arrow C in FIG. 29A).

The press-in portion 214a of the sheet output shaft 214 includes a first plane 214a1 and a second plane 214a2. The first plane 214a1 is parallel to the axial direction of the sheet output shaft 214. The second plane 214a2 is parallel to the axial direction of the sheet output shaft 214 and has a distance from the axial center O2 of the sheet output shaft 214 ("h2" in FIGS. 29A and 29B) longer (greater) than a distance from the axial center O2 to the first plane 214a1 ("h1" in FIGS. 29A and 29B) (h1<h2). The second plane 214a2 is disposed close to the axis center of the sheet output shaft 214 than the first plane 214a1 is to the axis center of the sheet output shaft 214. Further, the press-in portion 214a of the sheet output shaft 214 further includes a sloped face 214a3 that connects the first plane 214a1 and the second plane 214a2 and is angled relative to the axial direction of the sheet output shaft 214. The driven pulley 212 cannot be abutted against a step 214b that stands up in a normal direction from a downstream side end of the press-in portion 214a in the press-in direction of the driven pulley 212, as illustrated in FIG. 29A.

Figure 30B:
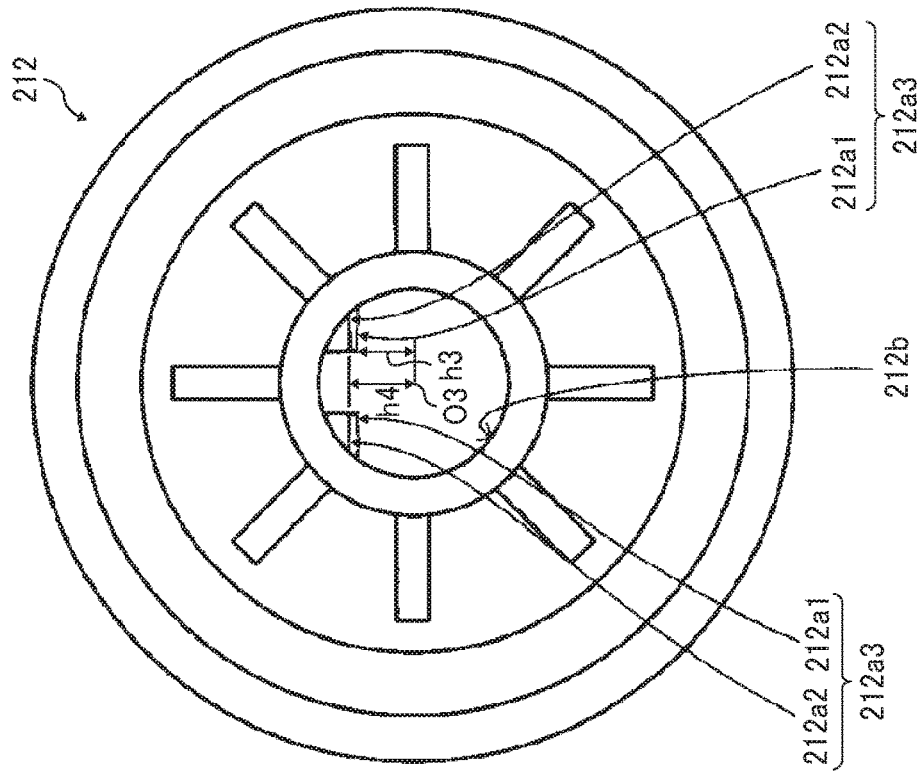
FIGS. 30A and 30B are diagrams illustrating the driven pulley.
Figure 30A:
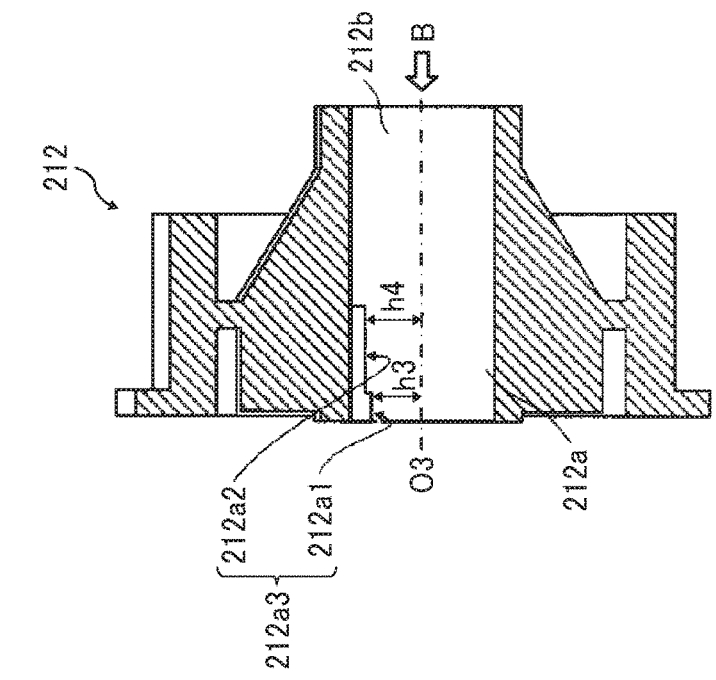

FIGS. 30A and 30B are diagrams illustrating the driven pulley 212. Specifically, FIG. 30A is a cross sectional view of the driven pulley 212. FIG. 30B is a diagram illustrating the driven pulley 212, viewed from the axial direction (i.e., a direction indicated by arrow B in FIG. 30A).

A press-in hole 212a having a D-shaped cross section and an insertion hole 212b at the center of rotation of the driven pulley 212. The insertion hole 212b is a circular cross shaped hole having a diameter substantially identical to the diameter of the sheet output shaft 214. The press-in hole 212a includes a pair of step portions 212a3 having a first inner circumferential plane 212a1 and a second inner circumferential plane 212a2. The second inner circumferential plane 212a2 has a distance from the axial center O3 of the sheet output shaft 214 ("h4" in FIGS. 30A and 30B) longer (greater) than a distance from the axial center O3 to the sheet output shaft 214 ("h3" in FIGS. 30A and 30B) (h3<h4).

A cut-in amount of the first inner circumferential plane 212a1 to the first plane 214a1 is set to be smaller than a cut-in amount of the second inner circumferential plane 212a2 to the second plane 214a2. Specifically, a relation of (h1−h3)<(h2−h4) is satisfied where "h1" represents a distance from the axial center O2 to the first plane 214a1, "h2" represents a distance from the axial center O2 to the second plane 214a2, "h3" represents a distance from the axial center O3 to the first inner circumferential plane 212a1 and "h4" represents a distance from the axial center O3 to the second inner circumferential plane 212a2.

FIGS. 31A, 31B, 31C and 31D are diagrams illustrating movement of the driven pulley 212 when the driven pulley 212 is pressed in to the sheet output shaft 214.

Figure 31A:
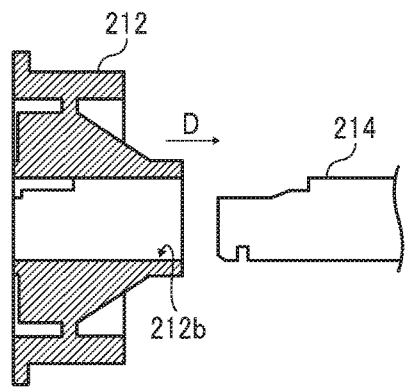
FIGS. 31A, 31B, 31C and 31D are diagrams illustrating movement of the driven pulley to be pressed into the sheet output shaft.

As illustrated in FIG. 31A, the driven pulley 212 is moved in a direction indicated by arrow D in FIG. 31A, so as to insert one end of the sheet output shaft 214 into the insertion hole 212b of the driven pulley 212. One end of the sheet output shaft 214 has a tapered shape increasing the diameter gradually toward the center of the sheet output shaft 214 in the axial direction. Therefore, even if the axial center of the driven pulley 212 is shifted from the axial center of the sheet output shaft 214 when the sheet output shaft 214 is inserted into the driven pulley 212, the tapered shape at the one end of the sheet output shaft 214 guides the driven pulley 212, so as to smoothly insert the sheet output shaft 214 into the insertion hole 212b of the driven pulley 212.

Figure 31B:
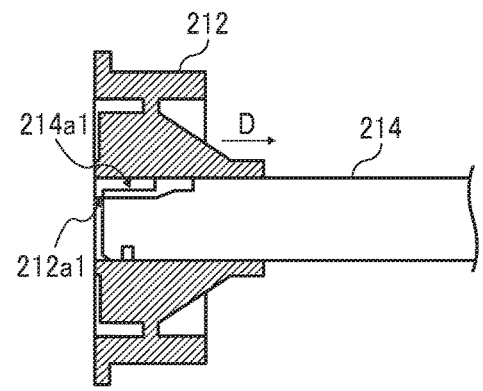

As the sheet output shaft 214 is inserted into the insertion hole 212b of the driven pulley 212, the first inner circumferential plane 212a1 of the press-in hole 212a abuts against the one end of the sheet output shaft 214, as illustrated in FIG. 31B. As the driven pulley 212 is further moved in the direction indicated by arrow D in FIG. 31B from this state, the first inner circumferential plane 212a1 is elastically deformed and is pressed in to the first plane 214a1 that extends to the one end of the sheet output shaft 214. The driven pulley 212 is further moved in the direction indicated by arrow D in FIG. 31B from this state. However, as described above, the cut-in amount of the first inner circumferential plane 212a1 to the sheet output shaft 214 is set to be smaller than the cut-in amount of the second inner circumferential plane 212a2 to the sheet output shaft 214. Consequently, the moving load of the driven pulley 212 is relatively small, and the driven pulley 212 can be moved in the direction D without applying a large amount of load.

Figure 31C:
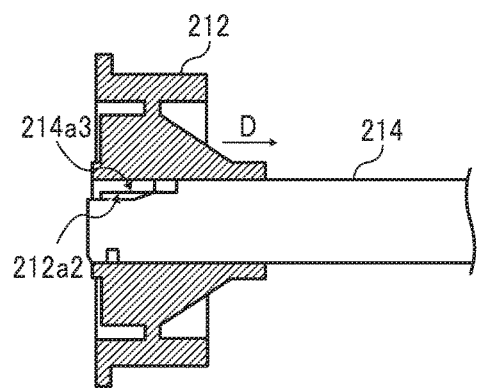
Figure 31D:
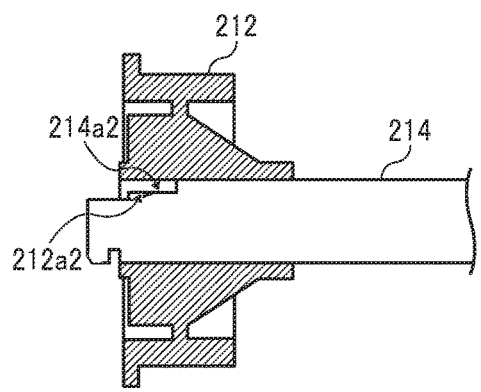

As the driven pulley 212 is moved in the direction D in FIG. 31B from the state of FIG. 31B, the leading end of the second inner circumferential plane 212a2 in a direction of movement of the driven pulley 212 contacts the sloped face 214a3, as illustrated in FIG. 31C. As the driven pulley 212 is further moved in the direction D in FIG. 31C from this state, the second inner circumferential plane 212a2 is elastically deformed by the sloped face 214a3 easily and is pressed in. By so doing, as illustrated in FIG. 31D, the second inner circumferential plane 212a2 is pressed in to the second plane 214a2 easily, and therefore the driven pulley 212 can be assembled to the sheet output shaft 214 easily.

By contrast, in a case in which the sloped face 214a3 is not provided to the sheet output shaft 214, the second inner circumferential plane 212a2 is elastically deformed quickly in order to press in the second inner circumferential plane 212a2 to the second plane 214a2. In this case, the driven pulley 212 may need to be pressed in hard, which leads to the poor assembly performance.

However, as described above, the cut-in amount of the first inner circumferential plane 212a1 to the first plane 214a1 (h1−h3) is set to be smaller than the cut-in amount of the second inner circumferential plane 212a2 to the second plane 214a2 (h2−h4). By so doing, the moving load of the driven pulley 212 becomes relatively small, and therefore the driven pulley 212 can be moved in the direction D without applying a large amount of load. By contrast, due to the difference of the cut-in amounts, it is likely that the driven pulley 212 is attached in a tilted manner or at an angle to the sheet output shaft 214.

In order to avoid such tilt of the driven pulley 212 relative to the sheet output shaft 214, the cut-in amount of the first inner circumferential plane 212a1 to the first plane 214a1 (h1−h3) is preferably set to be substantially equal to the cut-in amount of the second inner circumferential plane 212a2 relative to the second plane 214a2 (h2−h4), in other words, it is preferable to satisfy the following relation: (h1−h3)≈(h2−h4).

In the belt drive transmission mechanism 220, the portion of the driven pulley 212 to be pressed in the sheet output shaft 214 are divided into the first inner circumferential plane 212a1 and the second inner circumferential plane 212a2 in the axial direction. Therefore, when compared with the configuration in which the entire inner circumferential surface of the press-in hole 212a is pressed in to the sheet output shaft 214, a press-in area of the press-in hole 212a is reduced, and therefore the driven pulley 212 is pressed in to the sheet output shaft 214. Further, since both ends of the press-in hole 212a in the axial direction are pressed in, even if the press-in area of the press-in hole 212a is reduced, the driven pulley 212 can be fixedly pressed in to the sheet output shaft 214 without tilting.

Further, in the belt drive transmission mechanism 220, the gap is provided between the driven pulley 212 and the sloped face 214a3 of the press-in portion 214a of the sheet output shaft 214 in the state in which the driven pulley 212 is pressed in to the sheet output shaft 214, and therefore the driven pulley 212 is not in contact with the sloped face 214a3. Therefore, even when the axial lengths of the first plane 214a, the second plane 214a2 and the sloped face 214a3 are shifted relative to the specified lengths due to manufacturing errors, the driven pulley 212 can be pressed in to the press-in portion 214a entirely.

Further, as illustrated in FIG. 30B, the center in the left and right direction of the D-shaped portion of the press-in hole 212a is cut. Therefore, the pair of step portions 212a3 having the first inner circumferential plane 212a1 and the second inner circumferential plane 212a2 is provided on both lateral sides of the press-in hole 212a in FIG. 30B. By so doing, when the driven pulley 212 is inserted into the press-in portion 214a of the sheet output shaft 214, the first inner circumferential plane 212a1 and the second inner circumferential plane 212a2 are elastically deformed easily. Accordingly, the driven pulley 212 is assembled to the sheet output shaft 214 easily.

Further, in the belt drive transmission mechanism 220, a portion of the first plane 214a1 of the press-in portion 214a of the sheet output shaft 214 and an end portion thereof away from the portion have the same diameter. However, it is preferable that the diameter of the end portion away from the portion of the first plane 214a1 is smaller than the diameter of the portion of the first plane 214a1. By reducing the diameter of the end portion than the diameter of the portion of the first plane 214a1, when the second inner circumferential plane 212a2 is pressed in to the second plane 214a2, the first inner circumferential plane 212a1 is pressed in to the first plane 214a1. Therefore, the load for attaching the driven pulley 212 to the sheet output shaft 214 can be reduced, which is a preferable configuration.

The configurations according to the above-descried embodiments are not limited thereto. This disclosure can achieve the following aspects effectively.

Aspect 1.

In Aspect 1, a drive transmission device (for example, the drive transmission mechanism 90, the belt drive transmission mechanism 220) includes a drive transmission body (for example, the worm wheel 75, the driven pulley 212) and a rotary shaft (for example, the drive shaft 73, the sheet output shaft 214). A drive force is applied from a drive source (the drive motor 51, the sheet output motor 211) to the drive transmission body. The rotary shaft has a press-in portion (for example, the press-in portion 73a, the press-in portion 214a) mounted on one end thereof in the axial direction. The press-in portion has multiple planes (for example, the first plane 173a, the first plane 214a1, the second plane 173c, the second plane 214a2) disposed parallel to an axial direction and configured to receive the drive transmission body. The multiple planes include an upstream side plane (for example, the first plane 173a, the first plane 214a1) and a downstream side plane (for example, the second plane 173c, the second plane 214a2) disposed downstream from the upstream side plane in a press-in direction of the drive transmission body. The upstream side plane and the downstream side plane are aligned along the press-in direction of the drive transmission body and have respective distances different from each other from an axial center of the rotary shaft. A distance from the downstream side plane to the axial center is greater than a distance from the upstream side plane to the axial center.

In Aspect 1, out of the multiple planes, the distance from the downstream side plane to the axial center is greater than the distance from the upstream side plane to the axial center. Therefore, an upstream side outer diameter of the press-in portion in the press-in direction is smaller than a downstream side outer diameter of the press-in portion in the press-in direction. As a result, in a configuration in which the press-in opening of the drive transmission body is pressed into the press-in portion of the rotary shaft in the press-in direction, a downstream side inner diameter of the press-in opening in the press-in direction to be pressed into the downstream side of the press-in portion is greater than an upstream side inner diameter of the press-in opening in the press-in direction to be pressed into the upstream side of the press-in portion. Accordingly, as previously described with FIGS. 22A through 22C, after the upstream side of the press-in portion in the press-in direction is inserted into the press-in opening to some extent while having a gap with the inner circumferential surface of the press-in opening, the press-in opening is pressed into the press-in portion. When the upstream side of the press-in portion in the press-in direction is inserted into the press-in opening, the drive transmission body is moved as follows, so that the center of the press-in opening (for example, the broken line O3 in FIG. 22A) and the center of the rotary shaft (for example, the broken line O2 in FIG. 22A) are matched. That is, an opposed face of the press-in opening to be opposed to multiple planes disposed aligned along the press-in direction of the press-in portion causes the drive transmission body to move in a direction to separate from the multiple planes (for example, in a direction indicated by arrow S4 in FIG. 22B). As described above, by moving the drive transmission body, the inner circumferential surface of the press-in opening contacts a continuous face (for example, a circular arc surface in the present embodiment) of the press-in portion continuing from an upstream side end to a downstream side end of the press-in portion in the press-in direction. Accordingly, the center of the press-in portion (for example, the broken line O3 in FIG. 22A) and the axial center of the rotary shaft (for example, the broken line O2 in FIG. 22A) are matched. Then, by pressing the press-in opening into the press-in portion while the continuous face of the press-in portion is in contact with the inner circumferential surface of the press-in opening, the press-in opening can be pressed to the press-in portion in a state in which the center of the press-in opening and the axial center of the rotary shaft are matched.

As described above, in Aspect 1, part of the press-in portion can be inserted into the press-in opening before the press-in opening is pressed to the press-in portion, and therefore the continuous face of the press-in portion continuing from the upstream side end to the downstream side end of the press-in portion in the press-in direction can be used as a portion to cause the center of the press-in opening to match to the axial center of the rotary shaft. According to this configuration, the drive transmission body can be pressed into the press-in portion without visually matching the center of the press-in opening and the axial center of the rotary shaft. Accordingly, in a case in which the upstream side outer diameter of the press-in portion in the press-in direction is same as the downstream side outer diameter of the press-in portion in the press-in direction and the press-in opening is pressed to the press-in portion, when compared with the comparative configuration in which the center of the press-in opening and the axial center of the rotary shaft are matched visually, easier assembly of the drive transmission body to the rotary shaft can be achieved.

Aspect 2.

In Aspect 1, the press-in portion (for example, the press-in portion 73a, the press-in portion 214a) further includes a sloped face (for example, the sloped face 173b, the sloped face 214a3) connecting the upstream side plane (for example, the first plane 173a, the first plane 214a1) and the downstream side plane (for example, the second plane 173c, the second plane 214a2).

According to this configuration, as explained with FIG. 19, when the drive transmission body (for example, the worm wheel 75, the driven pulley 212) is shifted in the axial direction and the press-in opening (for example, the press-in hole 75c, the press-in hole 212a) is inserted into the press-in portion (for example, the press-in portion 73a, the press-in portion 214a) in a state in which the center of the press-in opening of the drive transmission body and the center of the rotary shaft (for example, the drive shaft 73, the sheet output shaft 214) are deviated from each other, the downstream side end of the press-in opening in the press-in direction contacts the sloped face. Further, as the drive transmission body is moved in the axial direction, the drive transmission body is moved in a direction to separate from the plane of the press-in portion, guided by the sloped face. According to this movement of the drive transmission body, the center of the press-in opening of the drive transmission body and the center of the rotary shaft are matched. Accordingly, by moving the drive transmission body in the axial direction, the center of the press-in opening of the drive transmission body and the center of the rotary shaft are matched, and therefore the drive transmission body can be pressed into the press-in portion easily.

Aspect 3.

In Aspect 1 or Aspect 2, the drive transmission body (for example, the worm wheel 75, the driven pulley 212) includes a press-in opening (for example, the press-in hole 75c, the press-in hole 212a) configured to be pressed to the press-in portion (for example, the press-in portion 73a, the press-in portion 214a) of the rotary shaft (for example, the drive shaft 73, the sheet output shaft 214). The press-in opening has an inner circumferential surface having multiple inner circumferential planes (the first inner circumferential plane 175a, the first inner circumferential plane 212a1, the second inner circumferential plane 175b, the second inner circumferential plane 212a2). The multiple inner circumferential planes are pressed to the multiple plane of the press-in portion.

According to this configuration, as described in the above-described embodiment, both ends in the axial direction of the press-in opening (for example, the press-in hole 75c, the press-in hole 212a) are pressed in, and therefore the drive transmission body can be fixedly pressed into the press-in portion.

Aspect 4.

In Aspect 3, out of the multiple inner circumferential planes, the distance from the downstream side plane (for example, the second inner circumferential plane 175b, the second inner circumferential plane 212a2) to the axial center is greater than the distance from the upstream side plane (for example, the first inner circumferential plane 175a, the first inner circumferential plane 212a1) to the axial center.

According to this configuration, as described in the above-described embodiment above, part of the press-in portion can be inserted into the press-in opening (for example, the press-in hole 75c, the press-in hole 212a) before the press-in opening is pressed into the press-in portion (for example, the press-in portion 73a, the press-in portion 214a).

Aspect 5.

In any one of Aspect 1 through Aspect 4, the drive transmission body (for example, the worm wheel 75, the driven pulley 212) includes a press-in opening (for example, the press-in hole 75c, the press-in hole 212a) configured to be pressed to the press-in portion (for example, the press-in portion 73a, the press-in portion 214a) of the rotary shaft (for example, the drive shaft 73, the sheet output shaft 214), and the press-in opening has a non-contact portion in which the drive transmission body does not contact the press-in portion.

According to this configuration, as described in the above-described embodiments, even when there are manufacturing errors, the drive transmission body can be pressed into a specified position in the axial direction.

Aspect 6.

In any one of Aspect 1 through Aspect 5, the driving force is transmitted to a drive target body (for example, the pair of cams 44, the pair of sheet output rollers 20) configured to a moving body (for example, the pressure roller 19) against a biasing body (for example, the pair of springs 43).

As described in the embodiments above, in the configuration in which the drive target body is driven to move the moving body against the biasing body, it is likely that the drive target body rotates faster than a rotation driving speed at which the drive target body is rotated by the driving force applied by the drive source, due to the biasing force applied by the biasing body. When the drive target body is rotated faster than the rotation driving speed by the driving force applied by the drive source, the drive transmission body collides with the upstream side drive transmitting body (for example, the worm 61) disposed at the upstream side of the drive transmitting direction to which the driving force is applied, in the rotational direction. In Aspect 6, the drive transmission body (for example, the worm wheel 75) is pressed into the rotary shaft (for example, the drive shaft 73), and therefore the drive transmission body does not have any backlash to the rotary shaft in the rotational direction. Consequently, vibration of the drive transmission body in the rotational direction after collision can be restrained, and therefore occurrence of noise due to vibration can be restrained.

Aspect 7.

In Aspect 6, the drive transmission device further includes a drive side coupling (for example, the drive side coupling 75a) configured to receive the driving force from the drive source (for example, the drive motor 51), a driven side coupling (for example, the driven side coupling 71b) configured to engage with the drive side coupling, and a torque limiter (for example, the torque limiter 72) configured to couple the drive side coupling and the driven side coupling while driving.

According to this configuration, as described in the embodiments above, when the drive target body (for example, the pair of cams 44) is rotated by the biasing body (for example, the pair of springs 43) faster than the rotation driving speed at which the drive target body is rotated by the driving force applied by the drive source, the driven side coupling is rotated faster than the drive side coupling. Therefore, the torque is applied to the torque limiter so as to start the torque limiter. When the torque limiter is started and the drive transmission is blocked, a rotational load such as a frictional force is generated to the torque limiter. The rotational load applied to the torque limiter becomes the rotational load to the drive target body, which brakes the rotation of the drive target body. As a result, the rotation of the drive target body is reduced, and therefore it is prevented that the driven side engagement projection (for example, the driven side engagement projection 171) collides of the driven side coupling with the drive side engagement projection (for example, the drive side engagement projection 175) of the drive side coupling 75*a* with great force. Consequently, occurrence of a sound of collision can be reduced.

By contrast, when the drive target body is rotated by the driving force applied by the drive source, the driving force is transmitted from the drive side coupling to the driven side coupling. Therefore, no torque is applied to the torque limiter, and therefore the torque is not started to operate. Accordingly, when the drive target body is rotated by the driving force applied by the drive source, the load is not applied, and therefore a motor that is less expensive and has a relatively small output torque can be employed.

Aspect 8.

In Aspect 6 or Aspect 7, the moving body is a pressure roller (for example, the pressure roller 19) configured to press a fixing roller (for example, the fixing roller 18).

According to this configuration, sound of collision generated when the pressure roller is separated from the fixing roller can be restrained.

Aspect 9.

In any one of Aspect 1 through Aspect 8, the drive transmission device further includes at least one spur gear (for example, the cam gear 55, the second output gear 54, the first output gear 53).

According to this configuration, as described in the embodiments above, the at least one gear moves in a thrust direction (an axial direction) when driving, and therefore the at least one spur gear is restrained from colliding a member disposed opposite the at least one spur gear in the thrust direction. Accordingly, sound of collision is restrained or prevented from occurring.

Aspect 10.

In any one of Aspect 1 through Aspect 8, the drive transmission device (for example, the sheet output drive device 210) further includes multiple pulleys (for example, the drive pulley 211*b* and the driven pulley 212) and a belt (for example the timing belt 213). The belt is wound around the multiple pulleys. One of the multiple pulleys is mounted on a shaft (for example, the sheet output shaft 214) of the drive target body (for example, the pair of sheet output rollers 20) to which the driving force is transmitted from the drive source (for example, the sheet output motor 211) via the belt. The rotary shaft is the shaft of the drive target body. The drive transmission body is a pulley (for example, the driven pulley 212) of the multiple pulleys, the pulley being mounted on the shaft of the drive target body.

According to this configuration, the multiple pulleys such as the driven pulley 212 can be easily pressed into the shaft of the drive target body. Further, by fixedly pressing the pulley into the shaft of the drive target body, generation of noise can be prevented.

Aspect 11.

In Aspect 10, the drive target body is a sheet output roller (for example, the pair of sheet output rollers 20).

According to this configuration, a noise generated when the sheet output roller is driven can be restrained.

Aspect 12.

In Aspect 12, an image forming apparatus (for example, the image forming apparatus 100) includes an image forming device (for example, the process cartridges 1) configured to form an image on a recording medium (for example, the sheet P); and the drive transmission device (for example, the drive transmission mechanism 90, the belt drive transmission mechanism 220) according to claim 1, configured to transmit the driving force applied by the drive source (for example, the drive motor 51, the sheet output motor 211) to the drive target body (for example, the pair of cams 44, the pair of sheet output rollers 20).

According to this configuration, easy assembly can be achieved.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A drive transmission device comprising:
   a drive transmission body to which a drive force is applied from a drive source; and
   a rotary shaft having a press-in portion mounted on one end thereof in an axial direction, the press-in portion having multiple planes disposed parallel to the axial direction and configured to receive the drive transmission body,
   the multiple planes including an upstream side plane and a downstream side plane disposed downstream from the upstream side plane in a press-in direction of the drive transmission body, the upstream side plane and the downstream side plane being aligned along the press-in direction of the drive transmission body and having respective distances different from each other from an axial center of the rotary shaft,
   a distance from the downstream side plane to the axial center being greater than a distance from the upstream side plane to the axial center.

2. The drive transmission device according to claim 1, wherein the press-in portion further includes a sloped face connecting the upstream side plane and the downstream side plane.

3. The drive transmission device according to claim 1, wherein the drive transmission body includes a press-in opening configured to be pressed to the press-in portion of the rotary shaft,
   wherein the press-in opening has an inner circumferential surface having multiple inner circumferential planes, and
   wherein the multiple inner circumferential planes are pressed to the multiple plane of the press-in portion.

4. The drive transmission device according to claim 3, wherein, out of the multiple inner circumferential planes, the distance from the downstream side plane to the axial center is greater than the distance from the upstream side plane to the axial center.

5. The drive transmission device according to claim 1, wherein the drive transmission body includes a press-in opening configured to be pressed to the press-in portion of the rotary shaft, and
   wherein the press-in opening has a non-contact portion in which the drive transmission body does not contact the press-in portion.

6. The drive transmission device according to claim 1, wherein the driving force is transmitted to a drive target body configured to a moving body against a biasing body.

7. The drive transmission device according to claim 6, further comprising:
 a drive side coupling configured to receive the driving force from the drive source;
 a driven side coupling configured to engage with the drive side coupling; and
 a torque limiter configured to couple the drive side coupling and the driven side coupling while driving.

8. The drive transmission device according to claim 6, wherein the moving body is a pressure roller configured to press a fixing roller.

9. The drive transmission device according to claim 1, further comprising at least one spur gear.

10. The drive transmission device according to claim 1, further comprising:
 multiple pulleys; and
 a belt wound around the multiple pulleys,
 wherein one of the multiple pulleys is mounted on a shaft of a drive target body to which the driving force is transmitted from the drive source via the belt,
 wherein the rotary shaft is the shaft of the drive target body, and
 wherein the drive transmission body is a pulley of the multiple pulleys, the pulley being mounted on the shaft of the drive target body.

11. The drive transmission device according to claim 10, wherein the drive target body is a sheet output roller.

12. An image forming apparatus comprising:
 an image forming device configured to form an image on a recording medium; and
 the drive transmission device according to claim 1, configured to transmit the driving force applied by the drive source to a drive target body.

* * * * *